United States Patent
McDonough et al.

(10) Patent No.: US 6,748,006 B1
(45) Date of Patent: Jun. 8, 2004

(54) METHOD AND APPARATUS FOR CONTROLLING SYSTEM TIMING WITH USE OF A MASTER TIMER

(75) Inventors: John G. McDonough, La Jolla, CA (US); Tien Q. Nguyen, San Diego, CA (US)

(73) Assignees: Texas Instruments Incorporated, Dallas, TX (US); Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/321,697

(22) Filed: May 28, 1999

(51) Int. Cl.[7] .............................................. H04L 1/707
(52) U.S. Cl. ...................................................... 375/140
(58) Field of Search ................................ 375/140, 144, 375/145, 148, 149, 347, 354, 357, 362

(56) References Cited

U.S. PATENT DOCUMENTS

| | | |
|---|---|---|
| 3,746,847 A | 7/1973 | Maritsas .................... 235/152 |
| 4,493,046 A | 1/1985 | Watanabe ................... 364/717 |
| 4,719,592 A | 1/1988 | Hunt |
| 4,780,840 A | 10/1988 | Van Den Ende |
| 4,817,148 A | 3/1989 | Lafferty et al. .............. 380/48 |
| 4,901,264 A | 2/1990 | Hayashi |
| 5,007,088 A | 4/1991 | Ooi et al. .................... 380/46 |
| 5,103,459 A | 4/1992 | Gilhousen et al. ............. 375/1 |
| 5,126,959 A | 6/1992 | Kurihara |
| 5,228,054 A | 7/1993 | Rueth et al. .................... 375/1 |
| 5,311,176 A | 5/1994 | Gurney ........................ 341/50 |
| 5,337,338 A | 8/1994 | Sutton et al. ............... 337/333 |
| 5,428,820 A | 6/1995 | Okada et al. ............... 455/38.3 |
| 5,499,280 A | 3/1996 | Wilson et al. .............. 377/108 |
| 5,532,695 A | 7/1996 | Park et al. ................... 341/173 |
| 5,642,377 A * | 6/1997 | Chung et al. ................ 375/145 |
| 5,764,687 A | 6/1998 | Easton |
| 5,878,075 A | 3/1999 | Frank et al. ................. 375/200 |
| 5,883,889 A | 3/1999 | Faruque ...................... 370/335 |
| 5,940,432 A * | 8/1999 | Saito et al. ................. 375/148 |
| 6,064,688 A * | 5/2000 | Yanagi ........................ 375/149 |
| 6,072,823 A | 6/2000 | Takakusaki |
| 6,141,374 A | 10/2000 | Burns |
| 6,400,752 B1 | 6/2002 | Suzuki et al. |

FOREIGN PATENT DOCUMENTS

| | | |
|---|---|---|
| JP | 9-55715 | 2/1997 |
| JP | 10-56404 | 2/1998 |

OTHER PUBLICATIONS

AK281 /CDMA / J(N)–TACS / AMPS ABP—Data Sheet, Asahi Kasei Microsystems Co., Ltd., pp.1–19 (date undetermined).

* cited by examiner

*Primary Examiner*—Stephen Chin
*Assistant Examiner*—Kevin Kim
(74) *Attorney, Agent, or Firm*—Frederick J. Telecky, Jr.; W. James Brady, III

(57) ABSTRACT

Unique methods and apparatus for maintaining timing in spread spectrum communications are described. One method involves the steps of repeatedly incrementing an N-bit master binary counter at a chip rate to provide a count that rolls over at or near the end of a nominal zero-offset pseudorandom noise (PN) sequence having a length of $2^N$. The method includes the further steps of, for each counter of a plurality of N-bit slave binary counters, repeatedly incrementing an N-bit slave binary counter at the chip rate to generate a count that is out-of-phase with the count associated with the N-bit master binary counter by a base station offset value and a path delay value.

10 Claims, 25 Drawing Sheets

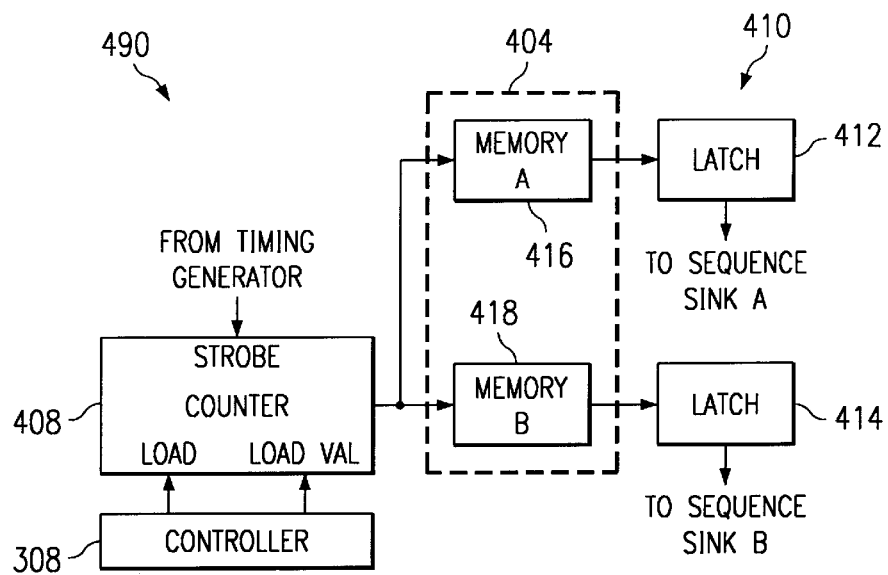
FIG. 4E
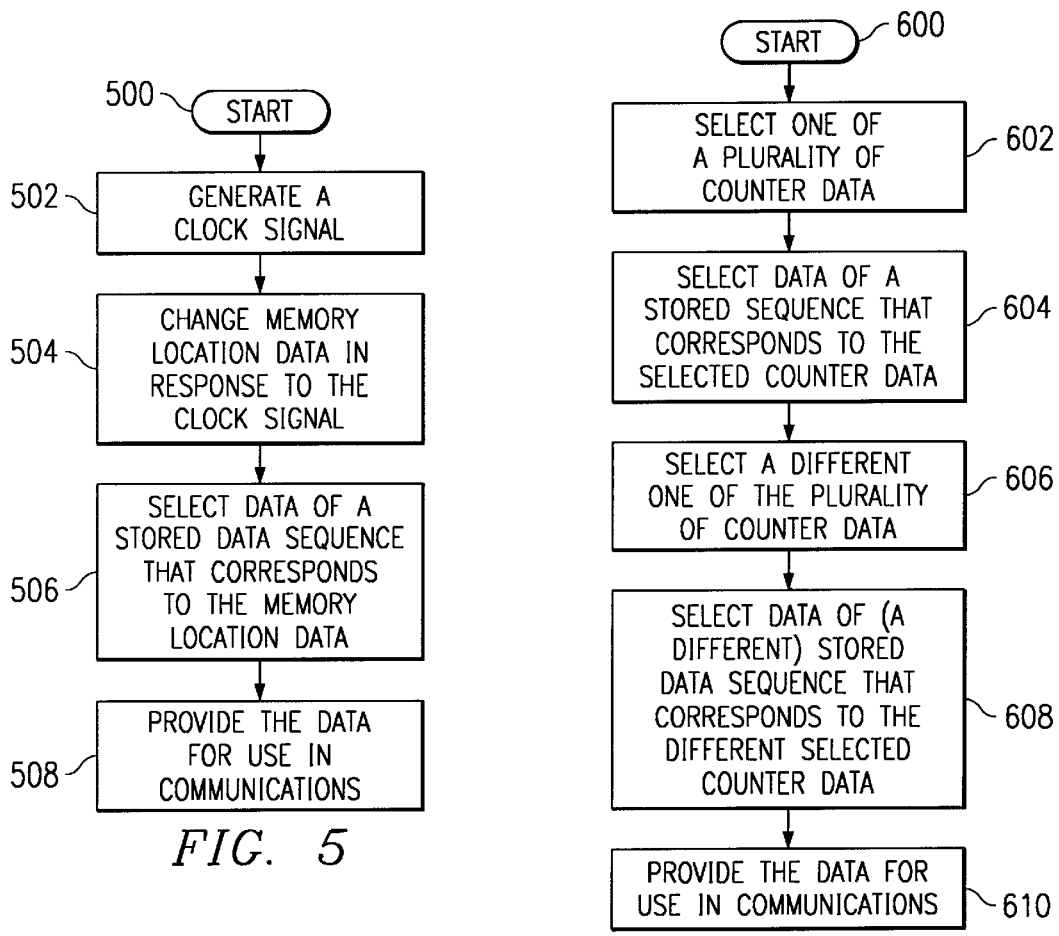
FIG. 5
FIG. 6

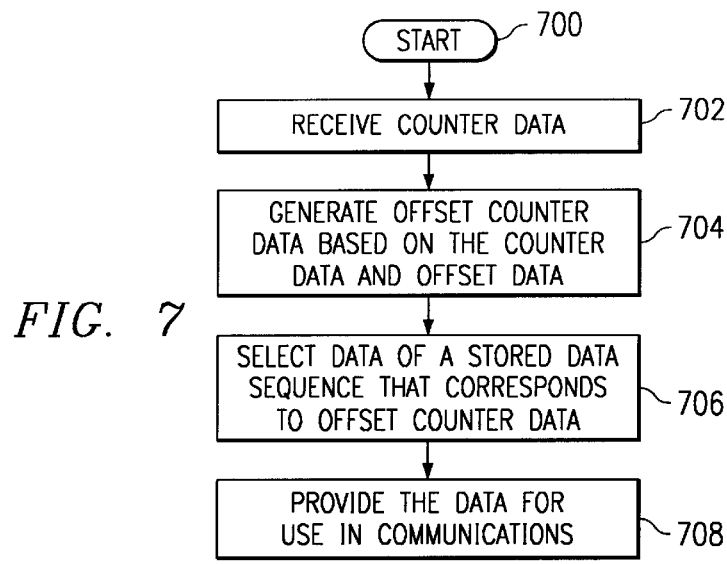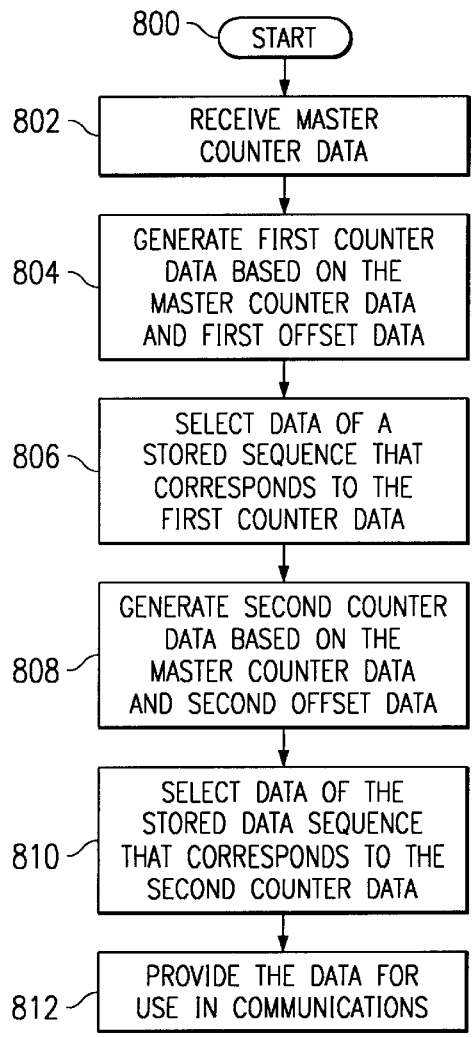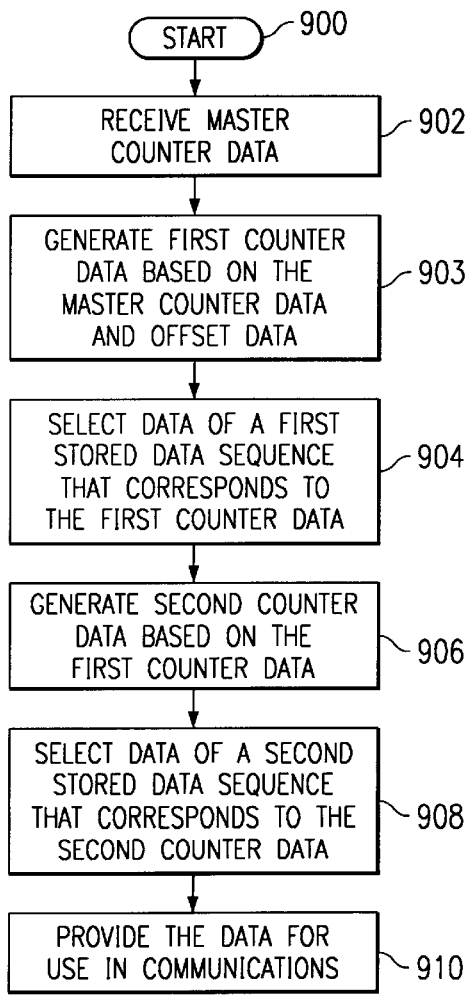
FIG. 7
FIG. 8
FIG. 9

| FUNCTION | MASKING FUNCTION | | WALSH$_{rot}$ |
|---|---|---|---|
| | BINARY REPRESENTATION OF QOF$_{sign}^{(hex)}$ | | |
| 0 | 00000000000000000000000000000000 00000000000000000000000000000000 | | $W_0^{256}$ |
| 1 | 7d72141bd7d8beb1727de4eb2728b1be 8d7de414d828b1417d8deb1bd72741b1 | | $W_{10}^{256}$ |
| 2 | 7d27e4be82d8e4bed87dbe1bd87d41e4 4eebd7724eeb288d144e7228ebb17228 | | $W_{213}^{256}$ |
| 3 | 7822dd8777d2d2774beeee4bbbe11e44 1e44bbe111b4b411d27777d2227887dd | | $W_{111}^{256}$ |

| FUNCTION | MASKING FUNCTION | | WALSH$_{rot}$ |
|---|---|---|---|
| | BINARY REPRESENTATION OF QOF$_{sign}^{(hex)}$ | | |
| 0 | 00000000000000000000000000000000 00000000000000000000000000000000 00000000000000000000000000000000 00000000000000000000000000000000 | | $W_0^{512}$ |
| 1 | 4bdd442d22b42d44771e78ee1e771187 b422442ddd4b2d4488e178eee1881187 d244ddb444d24b2211781c8887ee881e d244224b44d2b4dd1178e17787ee77e1 | | $W_{214}^{512}$ |
| 2 | 28e4be724172281b28e4be724172281b 1bd78d418dbee4d7e4287be72411b28 824eeb27142782b1824eeb27142782b1 b17dd814d8eb4e7d4e8227eb2714b182 | | $W_{117}^{512}$ |
| 3 | 2be7428e172481b2d4e7427117db7eb2 7142e7d44d8124e871bd18d4b2812417 18d471bd2417b281e7d4714224e84d81 4271d4e77eb217db428e2be781b21724 | | $W_{375}^{512}$ |

*FIG. 15F*

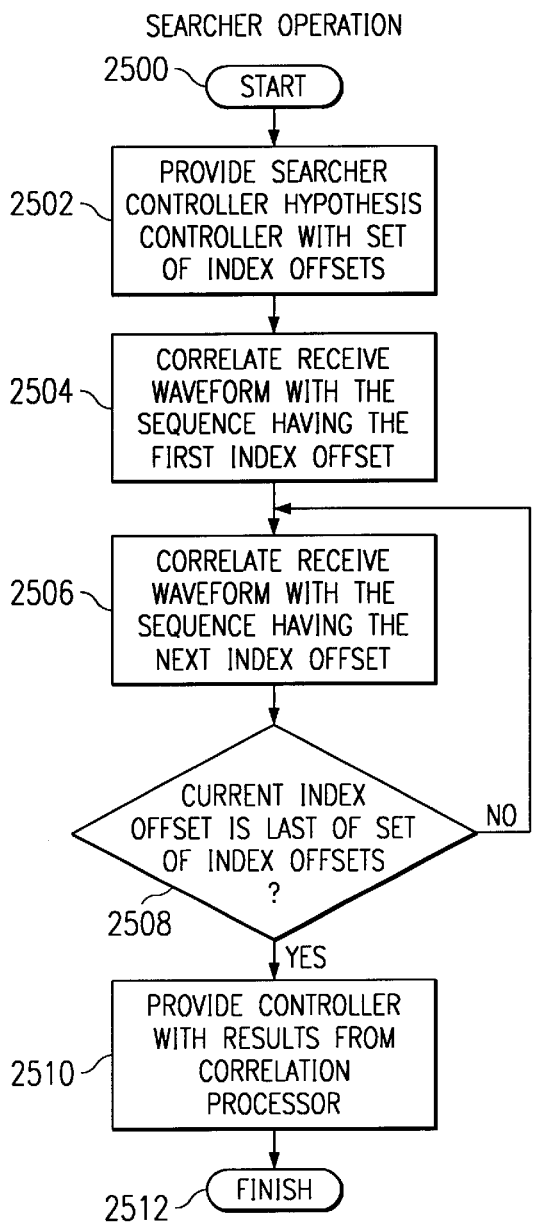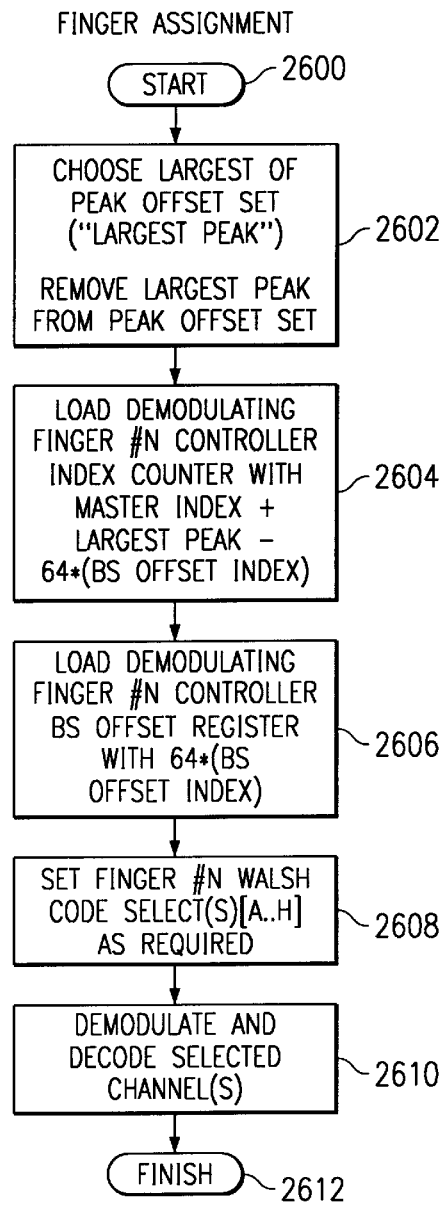
FIG. 25
FIG. 26

METHOD AND APPARATUS FOR CONTROLLING SYSTEM TIMING WITH USE OF A MASTER TIMER

CROSS-REFERENCE TO RELATED APPLICATIONS

U.S. Ser. No. 09/322,373, filed May 28, 1999 by J. McDonough, entitled "Method and Apparatus for Generating Data Sequences For Use in Communications;"

U.S. Ser. No. 09/322,282, filed May 28, 1999 by T. Nguyen et al., entitled "Device and Method for Generating Clock Signals From a Single Reference Frequency Signal and for Synchronizing Data Signals with a Generated Clock;"

U.S. Ser. No. 09/322,539, filed May 28, 1999 by E. Park, entitled "Pulse Density Modulator with Improved Pulse Distribution," and U.S. Ser. No. 09/322,240, filed May 28, 1999 by J. McDonough et al., entitled "Device and Method for Maintaining Time Synchronous with a Network Master Time.

BACKGROUND OF THE INVENTION

I. Field of the Invention

The present invention relates generally to the field of communications, as well as to the field of data sequence generators. More particularly, many embodiments of the invention relate to pseudorandom noise (PN) sequence generators for use in Direct Sequence Spread Spectrum (DSSS) communication systems.

II. Description of the Related Art

In direct sequence spread spectrum (DSSS) communication systems, such as Code Division Multiple Access (CDMA) systems, pseudorandom noise (PN) sequences are used to generate spread spectrum signals by increasing the bandwidth (i.e., spreading) of a baseband signal. In conventional methods, PN sequences are generated with PN generators that make use of Linear Feedback Shift Registers (LFSRs). An LFSR has a shift register of N stages and intervening exclusive-OR gates for programming a specific PN sequence. A subset of the PN sequences generated by an N-stage LFSR are characterized as maximal length (ML) PN sequences, and are of length $2^N - 1$.

As an example an ML PN sequence of length seven: (1) may be characterized as having seven states; (2) has associated with it six versions of the Nominal PN Sequence shifted by a non-zero number of PN chips; and (3) has three delay elements are required for operation. FIG. 1 is a block diagram of a conventional LFSR 100 for generating an ML PN sequence of length seven. LFSR 100 has three delay elements 102, 104, 106, an adder 108, a clock signal 110, and an output 112 providing the PN sequence. Addition is performed modulo two by adder 108. Clock signal 110 having a frequency equivalent to the rate of change of the state of the PN output sequence generated at output 112.

Table 1 below sets forth the six shifted versions of a periodic Nominal PN Sequence of length seven produced by LFSR 100 of FIG. 1. The bit patterns included with each row of the PN Sequence column correspond to the sequential values of the PN output sequence at output 112 (FIG. 1).

TABLE 1

PN SEQUENCES ASSOCIATED WITH THE LFSR OF FIG. 1

| DELAY IN NOMINAL PN SEQUENCE | PN SEQUENCE |
|---|---|
| 0 (NO SHIFT) | 1010011 (NOMINAL) |
| 1 | 1101001 |
| 2 | 1110100 |
| 3 | 0111010 |
| 4 | 0011101 |
| 5 | 1001110 |
| 6 | 0100111 |

Table 2 below provides a representation of the value of a nominal PN output sequence at output 112 as a function of the state of LFSR 100. The sequence of three bits within each row of the left hand column of Table 2, correspond (from left to right) to the outputs of delay elements 102, 104, and 106 (from left to right). The corresponding value of the output bit (i.e., chip) produced by LFSR 100 in response to a given LFSR state is set forth in the right hand column.

TABLE 2

CHIP VALUE PER GIVEN STATE FOR LFSR OF FIG. 1

| LFSR STATE | CHIP VALUE IN PN OUTPUT SEQUENCE |
|---|---|
| 111 | 1 |
| 110 | 0 |
| 011 | 1 |
| 100 | 0 |
| 010 | 0 |
| 001 | 1 |
| 101 | 1 |

In the communication systems where these LFSRs are used, it is often necessary to obtain shifted versions of PN sequences as well. Most desirably, shifted PN sequences need to be obtained in a time effective and direct manner (i.e., somewhat immediately). In direct sequence transmitters, for example, PN sequence shifting is required to enable the output of the transmitter's PN sequence generator to be aligned with some particular system time. In direct sequence receivers, PN sequence shifting is necessary to align the output of the receiver's PN sequence generator to the timing of a received waveform so as to enable despreading. In addition, PN sequence shifting is required for purposes of PN timing acquisition and multipath detection.

For any PN sequence of length L, there exist L−1 versions of the sequence which may be defined based on non-zero shifts of the sequence with respect to a reference sequence ("Nominal PN Sequence"). The L−1 shifted versions of the PN sequence of length L may be derived by delaying the nominal PN Sequence by from one to L−1 PN chips. Circuits similar to the LFSR 100 of FIG. 1 may be augmented with sequence shifting circuitry to enable generation of an arbitrarily shifted version of a given PN sequence.

A block diagram of a conventional LFSR circuit 200 is shown in FIG. 2, which provides arbitrarily shifted versions of a PN sequence having a length of seven. This conventional technique is based on the use of a modulo two sum of outputs of particularly selected delay elements of an additional LFSR (although a single LFSR may be used). Such techniques are predicated on the mathematical property that all possible shifted versions of a Nominal PN Sequence may be obtained through the modulo two addition of appropriately selected delay elements.

LFSR circuit 200 includes a primary LFSR 202, a secondary LFSR 204, and a masking circuit 206. As indicated, the state of the primary LFSR 202 is conveyed to secondary LFSR 204 by providing the value of each delay element within the primary LFSR 202 to a corresponding delay element within secondary LFSR 204. Although the PN sequence produced by secondary LFSR 204 will be identical to the Nominal PN Sequence by an offset in the manner described below. By coupling other secondary LFSRs and associated mask circuits to primary LFSR 202, a set of PN sequences of different offsets relative to the Nominal PN Sequence may be generated.

LFSR circuit 200 includes a set of two adders for performing modulo two addition. The adders are incorporated within the LFSR circuit 200 in such a manner that the Nominal PN sequence, the PN sequence, and the shifted PN sequence are all maximal length. The AND elements function to select outputs of the delay elements in accordance with the selection values M1, M2, and M3 provided by a controller (not shown). An active (binary value 1) selection value enables the output of the corresponding delay element to be summed modulo two at the adder with the outputs of other delay elements so selected, and an inactive selection value prevents the sum from occurring.

Table 3 below sets forth the six shifted versions of a periodic Nominal PN Sequence of length seven produced by LFSR circuit 200 of FIG. 2. The bit patterns included within each row of the PN Sequence column correspond to the sequential values of a particular shifted PN output sequence. As is indicated in Table 3, each PN output sequence is shifted relative to the Nominal PN Sequence by an amount determined by the combination of the selections of M1, M2 and M3.

TABLE 3

PN SEQUENCE SHIFTS FOR LFSR CIRCUIT OF FIG. 2

| SELECTION VALUE | | | SEQUENCE CHARACTERISTIC | |
| --- | --- | --- | --- | --- |
| M1 | M2 | M3 | SHIFT (DELAY) RELATIVE TO NOMINAL | PN SEQUENCE |
| 0 | 0 | 1 | 0 | 1010011 (NOMINAL) |
| 0 | 1 | 0 | 2 | 1110100 |
| 0 | 1 | 1 | 6 | 0100111 |
| 1 | 0 | 0 | 1 | 1101001 |
| 1 | 0 | 1 | 3 | 0111010 |
| 1 | 1 | 0 | 4 | 0011101 |
| 1 | 1 | 1 | 5 | 1001110 |

During operation, secondary LFSR circuit 204 is provided with a load signal (not shown) which causes the delay elements to latch the LFSR state registered by the corresponding delay elements of primary LFSR circuit 202. This causes the PN sequence provided by secondary LFSR 204 upon the output line to become aligned with the Nominal PN Sequence. However, such alignment will be maintained only so long as the clock signals provided to primary LFSR 202 and secondary LFSR 204 do not differ. When such a difference in clock signals arises, the PN sequence produced by secondary LFSR 204 will no longer be aligned with the Nominal PN Sequence.

No relationships are known to exist between the desired shift and the mask needed to generate such shift. Therefore, these masks are stored in a lookup table and accessed when a particular shift is desired. However, much memory space is consumed even if a limited number of masks are stored in connection with a PN sequence having a relatively long length. For example, 15,360 mask bits need to be stored if 512 masks are used in connection with a PN sequence having length $2^{15}-1$. After using a mask to obtain a "coarse" PN shift, subsequent slewing is required which consumes additional time to obtain the desired shift. As apparent, the use of LFSRs to generate PN sequence shifts is relatively complex and by no means straightforward in its approach.

In addition to shifting, it is often desirable to be able to determine the extent to which a particular (shifted) PN sequence is offset relative to a Nominal (unshifted) PN Sequence. That is, it is desirable to be able to read the current state or offset at which a particular PN sequence resides. For the LFSR circuit 200 of FIG. 2, the offset may be ascertained in a conventional fashion based on the states (i.e., the contents of the delay elements) of both LFSR 202 and secondary LFSR 204, which is relatively complicated.

Furthermore, techniques for extending the length of a given ML PN sequence from $2^N-1$ to $2^N$ were developed because ML PN sequences having length $2^N-1$ were not convenient in application. For example, U.S. Pat. No. 5,228,054 describes a PN generator that increases the length of a ML PN sequence by one PN bit (or chip) so as to provide a PN sequence that is a power of two (i.e., $2^N$) sequence length. These techniques, however, require the use of additional complex circuitry. For example, additional circuitry is needed for the detection of the appropriate "stuff state " in which to insert and additional sequence bit ('O'), as well as that circuitry needed for the insertion of the additional bit ('O').

As apparent, existing techniques are generally undesirable in that they are relatively complex and inflexible. There are only a limited number of LFSRs for a given N; the length of such sequences is restricted to $2^N-1$. Thus, LFSR techniques are limited in that they are not readily capable of generating any arbitrary data sequence, and are not readily capable of generating a sequence of arbitrary length. The LFSR circuit configuration must change if some other sequence is desired, which undesirably implicates the entire system design.

As to other aspects of the system, a forward link waveform transmitted by the base station may be comprised of a pilot waveform and a data waveform. Both of the waveforms ar received with the same relative phase and amplitude distortions introduced by the channel. The pilot waveform is an unmodulated PN sequence which aids in the demodulation process, as is well-known in the art as "pilot-aided demodulation." Conventional pilot-aided demodulation methods typically include the steps of (I) demodulating the pilot waveform, (II) estimating the relative phase and amplitude of the pilot waveform, (III) correcting the phase of the data waveform using the estimated phase of the pilot waveform, and (IV) adjusting the weight of data symbols used in maximal ratio combining in a RAKE receiver based on the estimated amplitude of the pilot waveform. Steps (III) and (IV) above are performed as a "dot product" as is known in the art. In come conventional methods, a controller having a central processing unit (CPU) and and/or a digital signal processor (DSP) performs each step described, including the dot product function. The dot product function, however, is computationally intensive, and typically places an undue and undesirable burden on the processor. In other conventional methods, hardware performs each step described. This approach, however, limits the flexibility in the filtering structure and selection of filter coefficients.

Accordingly, there is a need for new methods and devices to overcome these and other deficiencies of the related art, and especially a need for methods and devices to simplify data generators and system circuitry operating in connection with the same.

SUMMARY OF THE INVENTION

As one of the many inventive methods and devices described herein, a method of generating one or more data sequences for spread spectrum communications includes the steps of providing data at an input of a memory which stores bits associated with a pseudorandom noise (PN) sequence; changing the data; and for each of a plurality of changes of the data, providing a selected PN bit of the PN sequence at an output of said memory based on the data.

BRIEF DESCRIPTION OF THE DRAWINGS

FIGS. 3 and 4A–E are schematic block diagrams of data sequence generators.

FIGS. 5–9 are flowcharts describing methods of generating data sequences in connection with the diagrams of FIGS. 3 and 4A–E.

FIG. 15E is an illustration of an N-by-N Hadamard matrix, where N=64.

FIG. 15F are two tables showing masking functions associated with a 128-by-128 Hadamard matrix and a 256-by-256 Hadamard matrix.

FIG. 25 is a flowchart describing a method of performing a searcher operation of the mobile station of FIG. 10.

FIG. 26 is a flowchart describing a method of assigning a finger of a demodulator.

DETAILED DESCRIPTION OF THE PREFERRED EMBODIMENTS

As one of the many inventive methods and devices described herein, a method of generating one or more data sequences for spread spectrum communications includes the steps of providing data at an input of a memory which stores bits associated with a pseudorandom noise (PN) sequence; changing the data; and for each of a plurality of changes of the data, providing a selected PN bit of the PN sequence at an output of said memory based on the data.

Figure 1:
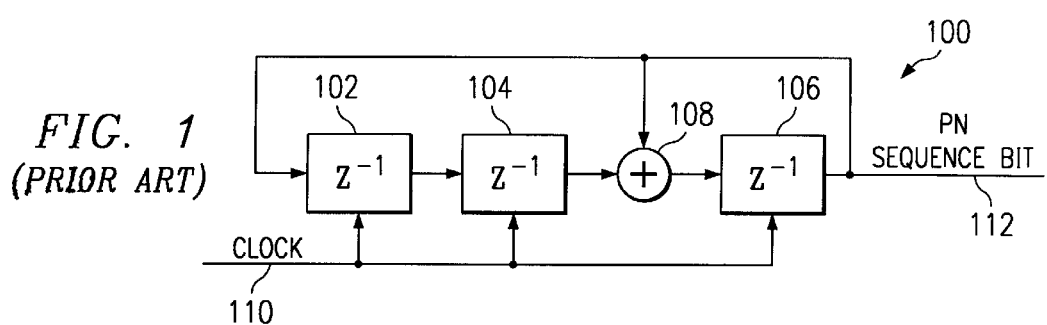
FIG. 1 is a block diagram of a conventional LFSR for generating an ML PN sequence of length seven.
Figure 2:
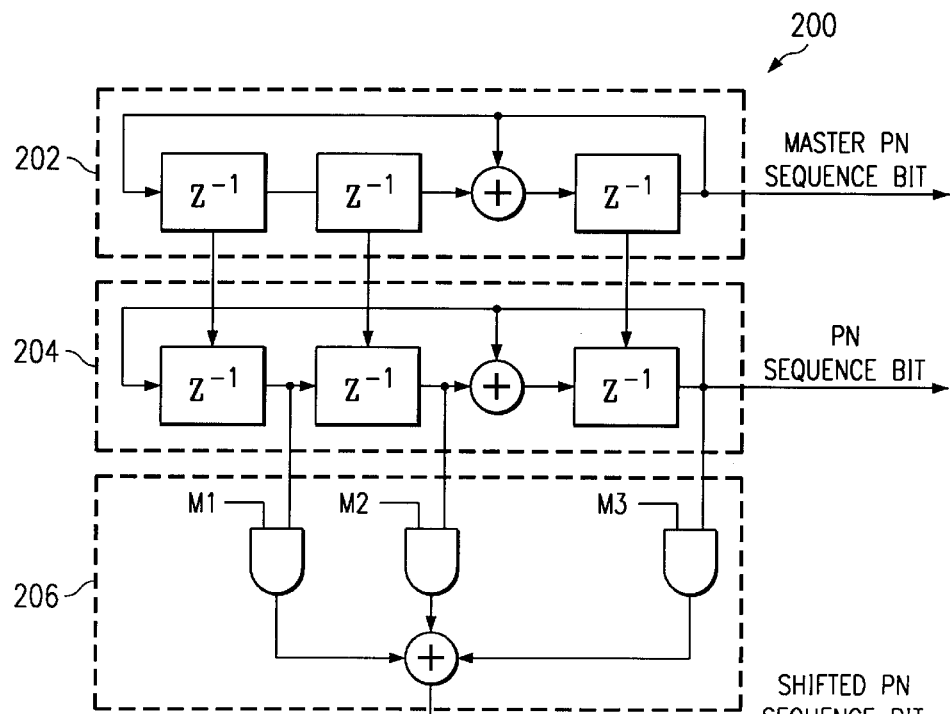
FIG. 2 is a block diagram of a conventional LFSR circuit providing shifting versions of the ML PN sequence of length seven.
Figure 3:
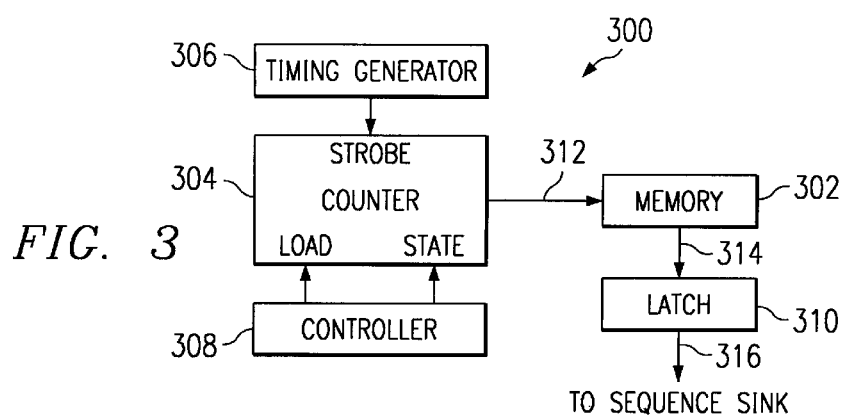

FIGS. 3 and 4A–E are schematic block diagrams of data sequence generators. Although a number of such generators are shown and described, they are by no means exhaustive as one skilled in the art will understand. FIG. 3 is a schematic block diagram of a data sequence generator 300, Data sequence generator 300 includes a memory 302, a counter 304, a timing generator 306, a controller 308 and a latch 310. Memory 302 has a data sequence stored therein. Counter 304 has an output coupled to an address input of memory 302 designated by a reference number 312. The output of counter 304 provides a memory address to select particular data of the stored data sequence. Thus, counter 304 may be understood more broadly to be an address generation unit. The selected data is provided by memory 302 at an output 314. Data from memory 302 may be latched using a latch 310, which provides the data to a sequence sink at output 316.

Controller 308 is operative to initialize or reset the count or state of counter 304 to some value. Controller 308 does this by providing the state to counter 304, and pulsing a load input of counter 304. Although controller 308 may be any device suitable for such purpose, it is preferably a microcontroller, a microprocessor, a digital signal processor (DSP), or a combination of any of the above having at least one central processing unit (CPU) and associated software or firmware.

Timing generator 306, which may be a simple clock circuit, has an output which is coupled to an input of counter 304 to provide a clock pulse thereto. In response to each clock pulse, counter 304 generates a new address at address input 312. Each new address corresponds to the next desired data of the stored data sequence. For a plurality of clock signals, then, counter 304 causes the generation of the entire stored data sequence in a serial fashion at outputs 314 and 316.

Preferably, the data in the data sequence is stored in memory 302 in some desired sequential manner. Thus, counter 304 generates a plurality of addresses in accordance with the sequential manner in which the data is stored, where each new address corresponds to the next desired data in the data sequence. The data in the data sequence may also be stored in a consecutive manner. Here, counter 304 generates a plurality of addresses in accordance with the consecutive manner in which the data is stored. Here, for example, counter 304 increments the value at its output by "one" in response to each clock pulse.

Memory 302 may be more broadly understood as a data access module. Preferably, memory 302 includes a non-volatile memory such as a read-only memory (ROM). Here, the ROM is programmed with the desired data sequence during its manufacturing process. The memory is also preferably a single ROM having a single addressable input for data sequence access.

Depending on the application, however, any suitable memory may be used and programmed when appropriate. For example, the memory may be a programmable read-only memory (ROM), an erasable programmable read-only memory (EPROM), an electrically erasable programmable read-only memory (EEPROM), or flash memory, in even other applications, the memory may be a volatile memory such as a random access memory (RAM) where the data sequence is stored when appropriate. Using the RAM, the data sequence(s) may be generated (e.g., by the controller or processor) prior to storage using the appropriate function associated therewith. With use of such memory, an appropriate sequence set of multiple sequence sets may be selectively generated and stored, where the controller and other components operate according to the appropriately selected mode based on the selected sequence (e.g., as detected by the controller).

In the preferred application, the data sequence is a PN sequence for use in a CDMA communication system. Here, counter 304 comprises at least a 15-bit binary counter to provide a count from 0 to $2^{15-1}$ (32,767). The current count of counter 304 is incremented by binary one in response to each clock signal (and each chip period). Once counter 304 reaches 32,767, it rolls over to zero. Thus, counter 304 preferably comprises a counter that counts at the chip rate and rolls over at the length of the PN sequence. Preferably, and more generally, the counter comprises an (at least) N-bit counter for generating a PN sequence of length $2^N$.

Two or more data sequences may be generated using data sequence generator 300 of FIG. 3. An example is provided, where two data sequences are stored in memory 302. The two data sequences are stored in an exemplary manner represented by Table 4 below.

TABLE 4

EXAMPLE OF STORAGE
OF TWO OR MORE DATA SEQUENCES

| ADDRESS | DATA SEQUENCE 1 AT BIT OUTPUT 1 | DATA SEQUENCE 2 AT BIT OUTPUT 2 |
|---------|----------------------------------|----------------------------------|
| 0000    | 0                                | 1                                |
| 0001    | 1                                | 1                                |
| 0002    | 1                                | 0                                |
| 0003    | 1                                | 1                                |
| ...     | ...                              | ...                              |

As shown, the first and second data sequences are stored in memory 302 in a parallel fashion. Each memory address corresponds to a two-bit data block, and memory 302 has a two-bit output. When counter 304 generates address '0000', memory 302 provides both bit '0' (data of the first data sequence) and bit '1' (data of the second data sequence) at the two-bit output. When counter 304 generates the next address '0001', memory 302 provides both bit '1' (next data of the first data sequence) and bit '1' (next data of the second data sequence) at the two-bit output. The generation continues until the sequences are complete. The process repeats for continuous regeneration. Thus, both data sequences are generated in a parallel and simultaneous fashion, and both are time aligned based on the same reference. As described below, the two data sequences may be PN data sequences having the same length (e.g., PN I and Q data sequences) for use in a CDMA communication system.

Figure 4A:
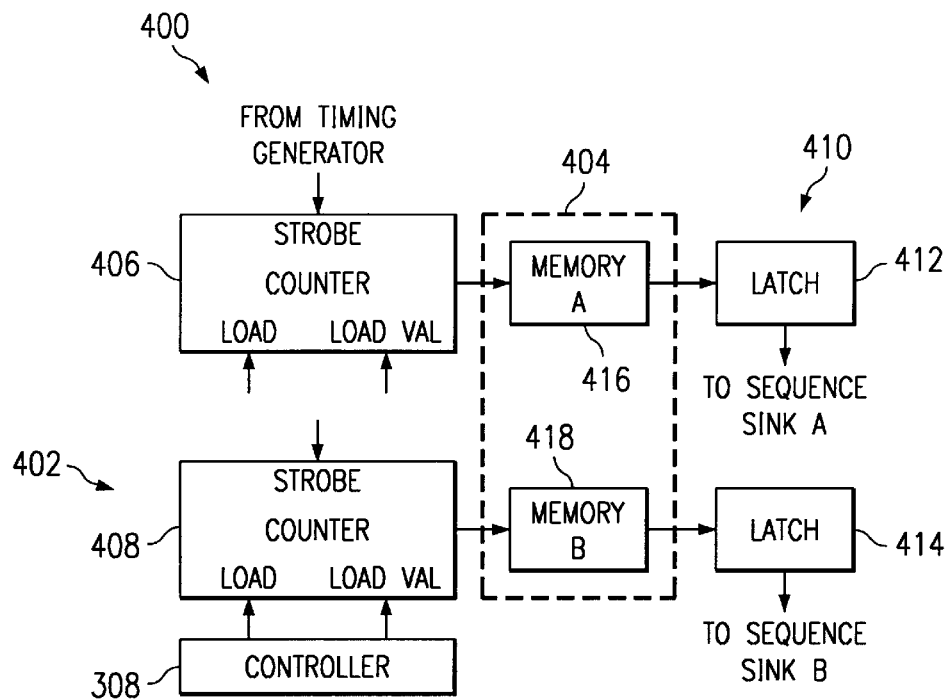

FIG. 4A shows a schematic block diagram of a data sequence generator 400. Data sequence generator 400 operates similarly to that shown and described in relation to FIG. 3, but uses a plurality of counters 402 to generate multiple data sequences in a parallel fashion. In the embodiment shown, data sequence generator 400 is operative to generate two data sequences. Data sequences generator 400 includes the plurality of counters 402, a data access module 404, and a plurality of latches 410. The plurality of counters 402 includes a counter 406 and a counter 408. Data access module 404 includes a data access module 416 and a data access module 418, both of which are shown as memories in FIG. 4A. Although not shown in FIG. 4A, counter 406 may be coupled to controller 308 (similar to counter 408) and counter 408 may be coupled to the timing generator (similar to counter 406).

Data access module 416 provides data of a first data sequence in response to an address from counter 406, and data access module 418 provides data of a second data sequence in response to an address from counter 408. As apparent, each one of counters 402 is associated with the generation of one of the first and the second data sequences. One of the plurality of latches 410, such as a latch 412 and a latch 414, may be utilized to capture corresponding data of a corresponding data sequence.

Figure 4B:
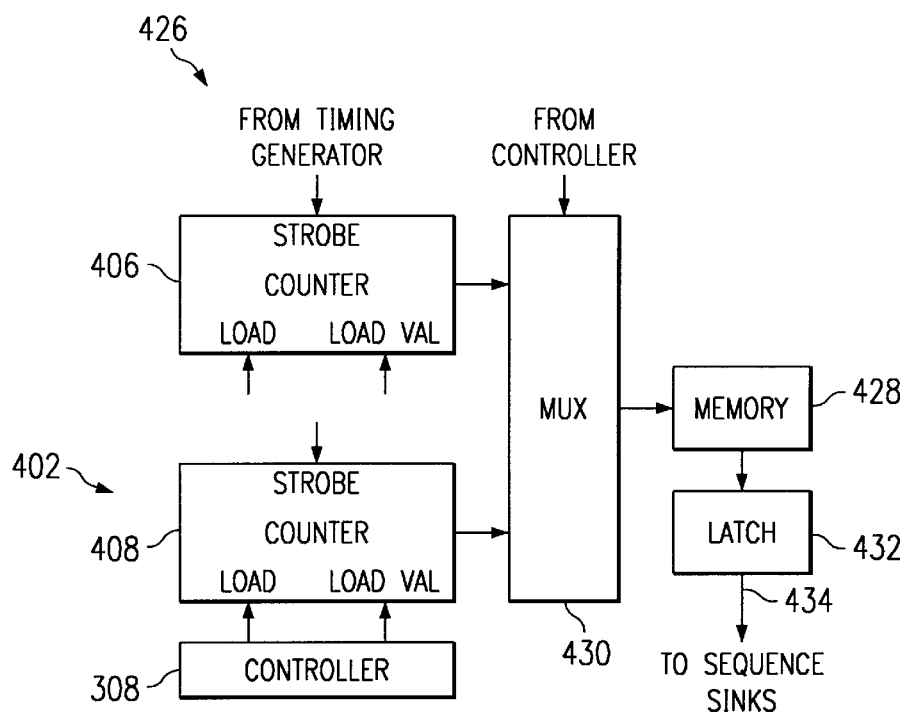

FIG. 4B shows a schematic block diagram of a data sequence generator 426. Data sequence generator 426 is similar to that shown and described in relation to FIG. 4A, but uses a single data access module and a multiplexer. Multiple data sequences may be generated using data sequence generator 426. Each one of the address outputs of counters 402 are selected with use of a multiplexer 430, which is controlled by controller 308. A single memory 428 has the plurality of data sequences stored therein. Each one of counters 402 is associated with the generation of at least one the plurality of data sequences. Accordingly, data sequence generator 426 generates a plurality of data sequences in a time-multiplexed fashion at an output of memory 428 (and at an output 434 of latch 432).

Figure 4C:
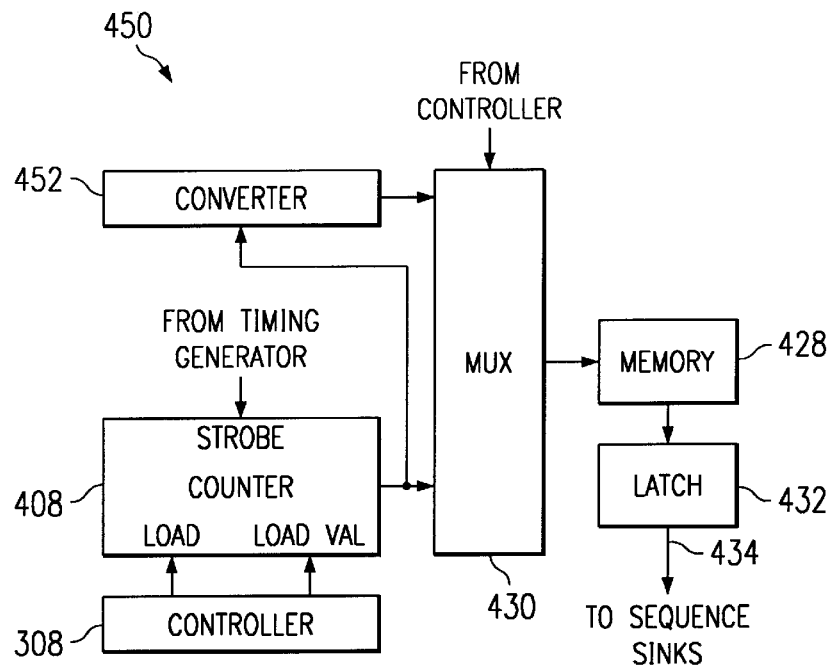

FIG. 4C is a schematic block diagram of another data sequence generator 450. Data sequence generator 450 is operative to generate at least two data sequences, and will be described as generating two. Memory 428 has both a first and a second data sequence stored therein. The sequences may be stored such that, for example, the second data sequence follows the first data sequence in memory 428. The two data sequences may be quite different from one another in terms of, for example, length and/or purpose. Although different, some predetermined relationship may exist between each data sequence. Although multiplexer 430 is shown for time-multiplexing these sequences, other configurations may be used as well.

Counter 408 is associated with the generation of the first data sequence using techniques described above. To generate the second data sequence, a converter 452 is used. Converter 452 may implement a function suitable to obtain the address of the next data of the second data sequence. Converter 452 may be, for example, an adder, subtractor, or modulo function. Converter 452 receives outputs of counter 408 and obtains some desired value based on the outputs. In one application, the first data sequence may comprise a PN I sequence and the second data sequence may comprise a PN Q sequence, where converter 452 is an adder or subtractor. In another preferred application, the first data sequence comprises a PN sequence (or both PN I and Q sequences stored in a parallel fashion) and the second data sequence comprises a Walsh code sequence associated with the PN sequence. In this case, converter 452 performs an addition function.

Figure 4D:
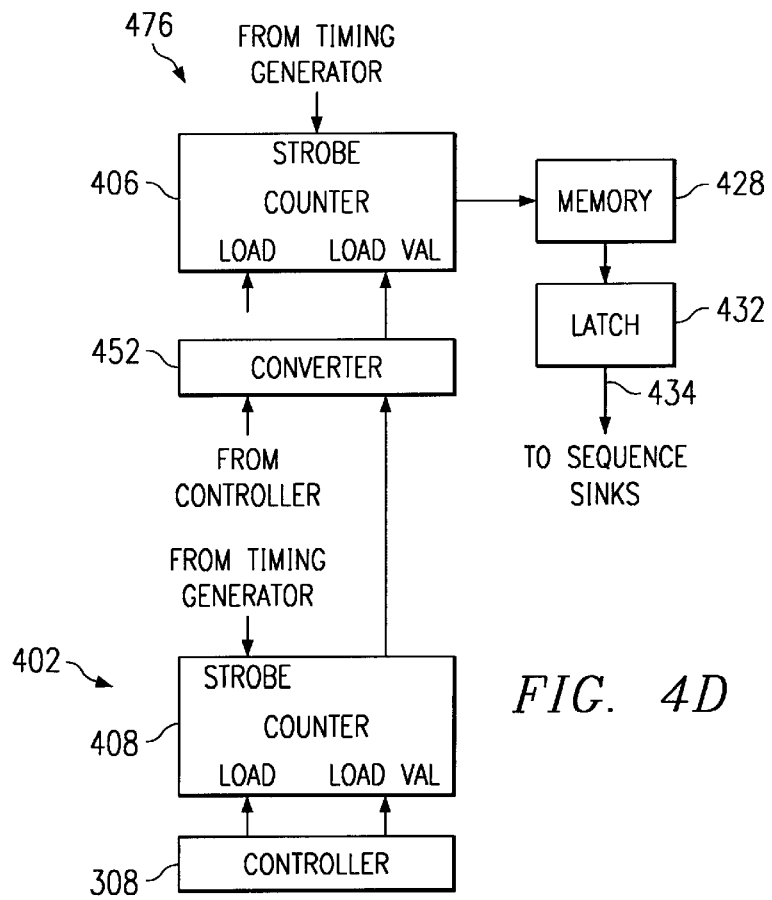

FIG. 4D is a schematic block diagram of a data sequence generator 476. In this embodiment, the plurality of counters 402 are utilized. Counter 408 may be referred to as a master counter which keeps a master time reference for the device in which it is embodied. In contrast, counter 406 may be referred to as a slave counter. After receiving a counter value from the output of counter 408, converter 452 converts the counter value into some desired value. This converted value is passed to counter 406 and is loaded therein at some point in time (e.g., in response to a load signal from controller 308). Counter 406 then operates independently from counter 408 for the generation of one or more data sequences in memory 428. Thus counter 406 may be offset from counter 408. Although counter 406 counts in response to the same clock 415 signal from the timing generator, its count may be advantageously adjusted or "tweaked" from time to time without affecting counter 408 or other counters. (Such an adjustment may be performed as described later below.) As in other described embodiments, converter 452 may perform any suitable function such as an additive, subtractive, modulo, or other.

FIG. 4E is a schematic block diagram of a data sequence generator 490. Data sequence generator 490 is operative to generate multiple data sequences in connection with counter 408. Data access modules 416 and 418 are separately addressable; and each provide a data sequence at its associated output. As described above, each one of data access modules 416 and 418 may be a memory, such as a ROM. As apparent, conversion of the counter value from counter 408 is optional; the direct outputs of counter 408 may be sufficient for the generation of multiple data sequences associated with data access modules 416 and 418.

As described, memory utilized in connection with the above embodiments is preferably a ROM having a single addressable input for data sequence access. One or more data sequences may stored in the single ROM and accessed together in parallel or in a time multiplexed fashion. Some of the multiple data sequences may accessed together in parallel while some may be accessed in a time multiplexed fashion.

FIGS. 5 through 9 are flowcharts describing methods relating to various aspects of generating data sequences. Although a number of different methods are shown, these methods are not exhaustive as one skilled in the art will understand. The methods may be implemented using one or more of the data sequence generators shown and described in relation to FIGS. 3, 4A, 4B, 4C, 4D, or 4E or any other suitable generators. The methods may be used in connection with any suitable data sequences desired, and preferably with data sequences corresponding to PN sequences and codes.

FIG. 5 is a flowchart describing a method of generating a data sequence. Beginning at a start block 500, a clock signal is generated (step 502). Memory location data is changed in response to the clock signal (step 504). Data of a stored data sequence that corresponds to the memory location data is selected (step 506). The selected data is provided for use in communication (step 508). Preferably, the method repeats at step 504 for generation of the entire sequence. Also preferably, the memory location data is changed in a consistent, sequential, linear fashion (e.g., incrementing or decrementing the memory location data by a predetermined quantity). Also preferably, the stored data sequence is a PN sequence or a code utilized for communications.

FIG. 6 is a flowchart describing a method of generating a plurality of data sequences. Beginning at a start block 600, one of a plurality of counter data is selected (step 602). Data of the stored data sequence that corresponds to the selected counter data is selected (step 604). Next, a different one of the plurality of counter data is selected (step 606). Data of the stored data sequence that corresponds to the different selected counter data is selected (step 608). Finally, the data selected in steps 604 and 608 is provided for use in communication (step 610). Preferably, the method repeats at step 602 for generation of the entire sequences. The data selected in step 608 may be from a stored data sequence that is the same as that selected from in step 604, or a different stored data sequence. If data from the same stored data sequence is accessed, for example, the two generated sequences may be out of phase from one another (depending on the counter data).

FIG. 7 is another flowchart describing a method of generating a data sequence. Starting at a start block 700, counter data is received (step 702). Offset counter data is generated based on the counter data received and offset data (step 704). Data of a stored data sequence that corresponds to the offset counter data is selected (step 706). The data selected in step 706 s provided for use in communication (step 708). Preferably, the method repeats at step 702 for generation of the entire sequence. The counter data is preferably associated with a master counter of the system.

FIG. 8 is a flowchart for generating a plurality of data sequences. Beginning at a start block 800, master counter data is received (step 802). First counter data is generated based on the master counter data and first offset data (step 804). Data of a stored data sequence that corresponds to the first counter data is selected (step 806). Second counter data is generated based on the master counter data and second offset data (step 808). Data of the stored data sequence that corresponds to the second counter data is selected (step 810). The data selected in steps 806 and 810 is provided for use in communications (step 812). In the preferred application, the stored data sequence is a PN sequence, the first and second offset data are associated with first and second base station offsets respectively, and the generation of counter data is performed using separate adders.

FIG. 9 is a flowchart describing another method of generating a plurality of data sequences. Beginning at a start block 900, master counter data is received (step 902). First counter data is generated based on the master counter data and offset data (step 903). Data of a first stored data sequence that corresponds to the first counter data is selected (step 904). Second counter data is generated based on the first counter data (step 906). Data of a second stored data sequence that corresponds to the second counter data is selected (step 908). The data selected in steps 904 and 908 is provided for use in communications (step 910). In the preferred application, the first stored data sequence is a PN sequence, the second stored data sequence is a Walsh code sequence, and the offset data is based on base station offset data and path delay data.

Figure 10:
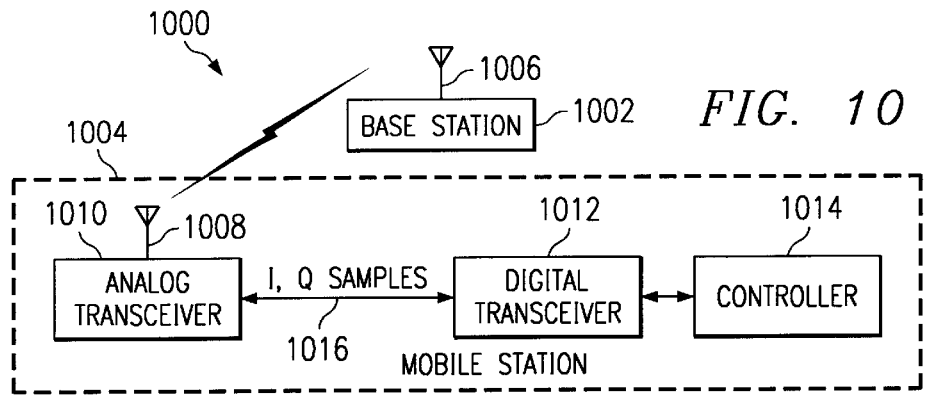
FIG. 10 is a schematic block diagram of a communications system including a base station and a mobile station which may embody the present invention.

Referring now to FIG. 10, a block diagram of a communication system 1000 which may embody the present invention is shown. In this embodiment, communication system 1000 is a code division multiple access (CDMA) communication system using direct sequence spread spectrum (DSSS) techniques. Communication system 1000 includes one or more base stations, such as a base station 1002, and one or more mobile stations, such as a mobile station 1004. Mobile station 1004 is a type of portable electronic device, which may be battery-operated, providing for wireless communications. Mobile station 1004 includes an antenna 1008 coupled to an analog transceiver 1010, a digital transceiver 1012 coupled to analog transceiver 1010, and a controller 1014. Base station 1002 has an antenna 1006 and other known components for communication.

Analog transceiver 1010 of mobile station 1004 employs conventional techniques for signal reception and transmission. During reception, analog transceiver 1010 receives DSSS signals via antenna 1008 for demodulation into I (in-phase) and Q (quadrature) signal samples. These signals are passed to digital transceiver 1012 for further signal demodulation. During transmission, digital transceiver 1012 encodes I and Q signals appropriately, which are passed to analog transceiver 1010 for modulation and transmission via antenna 1008. Controller 1014 controls these and other functions of mobile station 1004, as will be described below. Although controller 1014 may be any device suitable for such purpose, it is preferably a microprocessor, a digital signal processor (DSP), or a combination of the above, having at least one central processing unit (CPU) and associated software or firmware. Preferably, substantially all of the components described in connection with digital transceiver 1012 and controller 1014 are manufactured in a single integrated circuit (IC) and coupled to a substrate such as a printed circuit board (PCB) in mobile station 1004.

Figure 11:
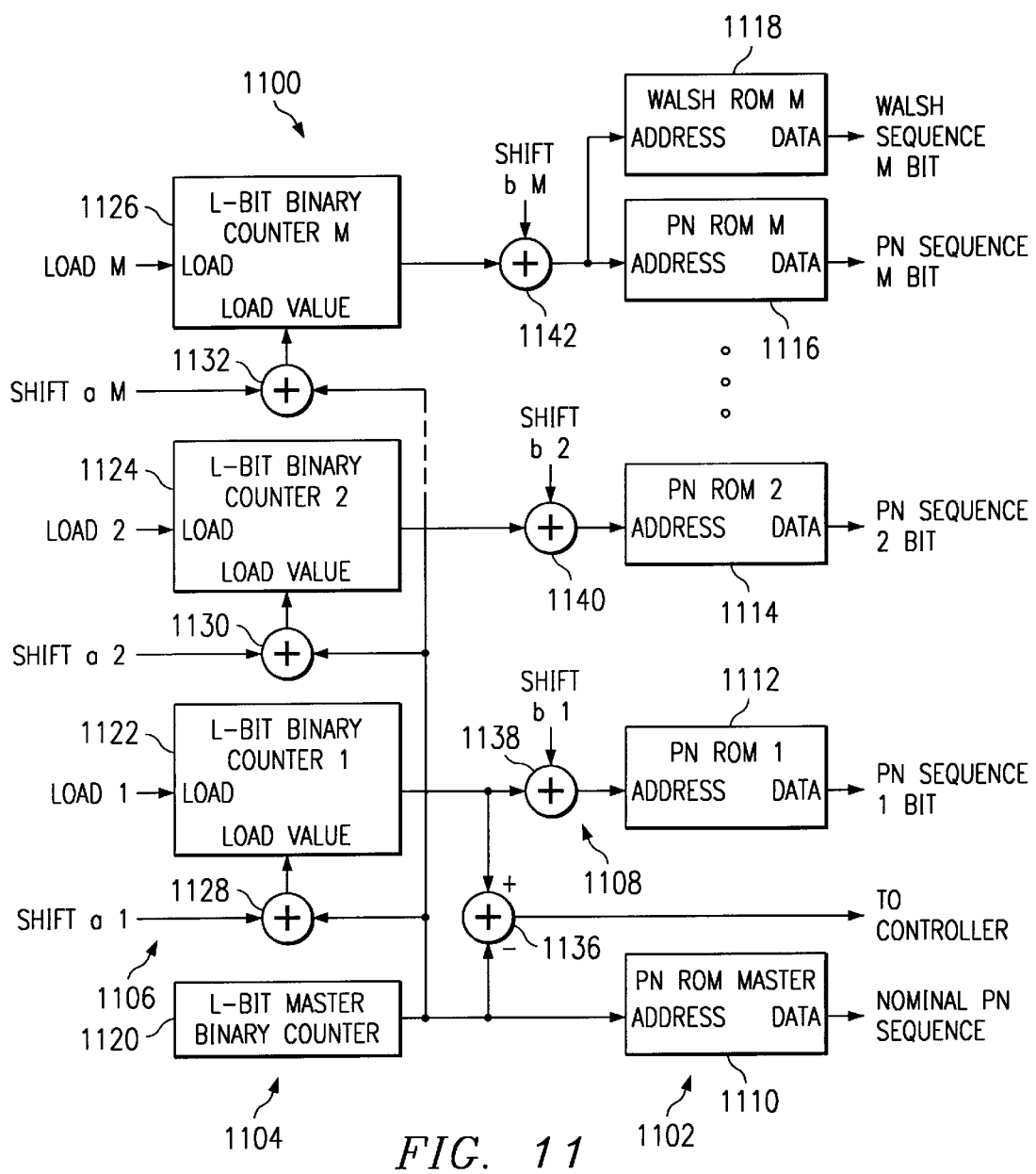
FIG. 11 is a schematic block diagram of a data sequence generator which may be embodied in the mobile station of FIG. 10.

FIG. 11 shows one type of a data sequence generator 1100 which may be incorporated within digital transceiver 1012 of FIG. 10. In this embodiment, data sequence generator 1100 includes a plurality of memories 1102, a plurality of counters 1104, a plurality of adders 1106, and a plurality of adders 1108. Data sequence generator 1100 is operative to generate a plurality of data sequences as indicated. In the preferred application, each one of the PN I and Q sequences generated is associated with, for example, one demodulating finger of a CDMA receiver.

The plurality of memories 1102 shown in FIG. 11 include memories 1110, 1112, 1114 and 1116. In this embodiment, each one of memories 1102 is a ROM. Memories 1110, 1112, 1114 and 1116 each store PN I and Q sequences, while memory 1118 stores Walsh code and/or symbol sequences utilized in the system. Preferably, each one of memories 1102 has a two-bit output, one for the PN I bit and one for the PN Q bit as described above in association with FIG. 3. Although FIG. 11 shows only a memory 1118 storing Walsh data and coupled in association with counter 1126, Walsh data is preferably associated with each one of counters 1104 and may be coupled in the same manner. However, memory is not required in the preferred embodiment.

Although shown in FIG. 11 as separate memories, one or more of memories 1102 may be part of the same memory where multiplexing techniques are used (such as those described above). Most preferably, all of memories 1102 comprise a single ROM storing only a single set of PN I and Q sequences, where multiple PN I and Q sequences are generated using multiplexing techniques.

The plurality of counters 1104, which are binary counter, includes counters 1120, 1122, 1124 and 1126 as shown. Once loaded, counters 1106 may operate independently of each other. Each of the counters 1104 receive a clock signal from a clock circuit not shown in FIG. 11. Each of counters 1104 provide continuously incrementing counter values to a respective one of memories 1102 for the generation of the plurality of data sequences. For the generation of PN sequences, counters 1104 count up to $2^{15}$ (or perhaps $2^{15}-1$ if "bit stuffing" of the prior art is utilized) and rollover to zero.

Counter 1120 is a master counter which keeps a master time reference for mobile station 1004. Counter 1120 is first initialized to be in alignment with the master time reference. Each one of counters 1122, 1124 and 1126 (slave counters) receives a counter value that is the sum of the master counter value and an offset value or shift. This is done using the plurality of adders 1106, which includes adders 1128, 1130, and 1132. Each one of adders 1106 receives an offset value (or none) from the controller. The plurality of adders 1108, which includes adders 1138, 1140, and 1142, provide a desired shift to a respective counter after it has been loaded. Each one of adders 1108 has an input coupled to the output of a counter and another input to receive an offset value or shift from the controller. Each one of adders 1108 also has an output coupled to an address input of (its associated) memory. In the preferred application, each one of the shifts provided at adders 1108 corresponds to a desired base station offset, and each one of the shifts provided at adders 1106 corresponds to a desired correction to the base station offset based on path delay.

When strobing a counter to load a counter value synchronous to the clock updating the counter state, it may be required to increment the counter value by one so as to accomplish the proper offset due to the fact that, coincident with the clock, the master counter will be updated as well.

The count or "state" of any slave counter relative to counter 1120 (the master counter) may easily be read. To read counter 1122, for example, an adder 1136 may have a first input coupled to the output of counter 1122 and a second input coupled to the output of counter 1120. With adder 1136, the output of counter 1120 is subtracted from the output of counter 1122. The output of adder 1136 is passed to controller 1014 (FIG. 10) for reading the result.

With use of the devices and methods described herein, the present invention may generate most any arbitrary data sequence. In the preferred CDMA application, for example, particular data sequences are useful. According to IS-95 standards, the short code I-sequence is associated with the polynomial $$P_I(X)=X^{15}+X^{13}+X^9+X^8+X^7+X^5+1,$$

and the Q-sequence is associated with the polynomial $$P_Q(X)=X^{15}+X^{12}+X^{11}+X^{10}+X^6+X^5+X^4+X^3+1.$$

Each one of these I and Q sequences has $2^{15}-1$ data bits. According to the present invention, memory stores one or both of the data sequences based on these polynomials. Preferably, the memory has stored therein the data sequences of length $2^{15}$ bits compliant with the IS-95 standards. Advantageously, circuit detection and insertion of these bits is not utilized for sequence generation.

For the IS-2000 proposed standard, which is outlined generally in the TIA/EIA/IS-2000.2 Ballot Version (Section 2.1.3.1.13.2, "Spreading Rate 3"), the PN sequences are defined to be truncated sequences of a maximal length linear feedback shift register sequence based upon the following characteristic polynomial $$P(X)=X^{20}+X^9+X^5+X^3+1.$$

The data sequence based upon the above polynomial is of length $2^{20}-1$. The I and Q PN sequences are both formed from this sequence using different starting positions and truncating the sequences after $3\times2^{15}$ chips. The starting position of the I PN sequence is such that the first chip is the 'I' after the 19 consecutive 'O's. The starting position of the Q PN sequence is the starting position of the I PN sequence delayed by $2^{19}$ chips. A mobile station aligns the I and Q PN sequences such that the first chip of the I PN sequence on every even second mark as referenced to the transmit time reference is the 'I' after the 19 consecutive 'O's. The chip rate is 3.6864 Mcps, and the PN sequence period is 3 ×32768/3686400=26.666 msecs, and exactly 75 pilot PN sequence repetitions occur every 2 seconds. According to the present invention, the memory may store such truncated data sequences and operate accordingly.

In one embodiment, the memory stores those data sequences required for operation in accordance with both IS-95 and IS-2000 standards. The mobile station selects the appropriate data sequence(s) (i.e., IS-95 or IS-2000) in response to control data which indicates the appropriate system in which to operate. The control data may be stored in non-volatile memory, such as a PROM, EPROM, or EEPROM, which is programmed prior to use of the mobile station. Alternatively, the memory comprises flash memory for storing the appropriate data sequence(s). Also alternatively, the design of the mobile station may allow for the memory to be physically separable from the other components so that the appropriate memory having the appropriate data sequence(s) may be inserted into the mobile station.

Figure 12:
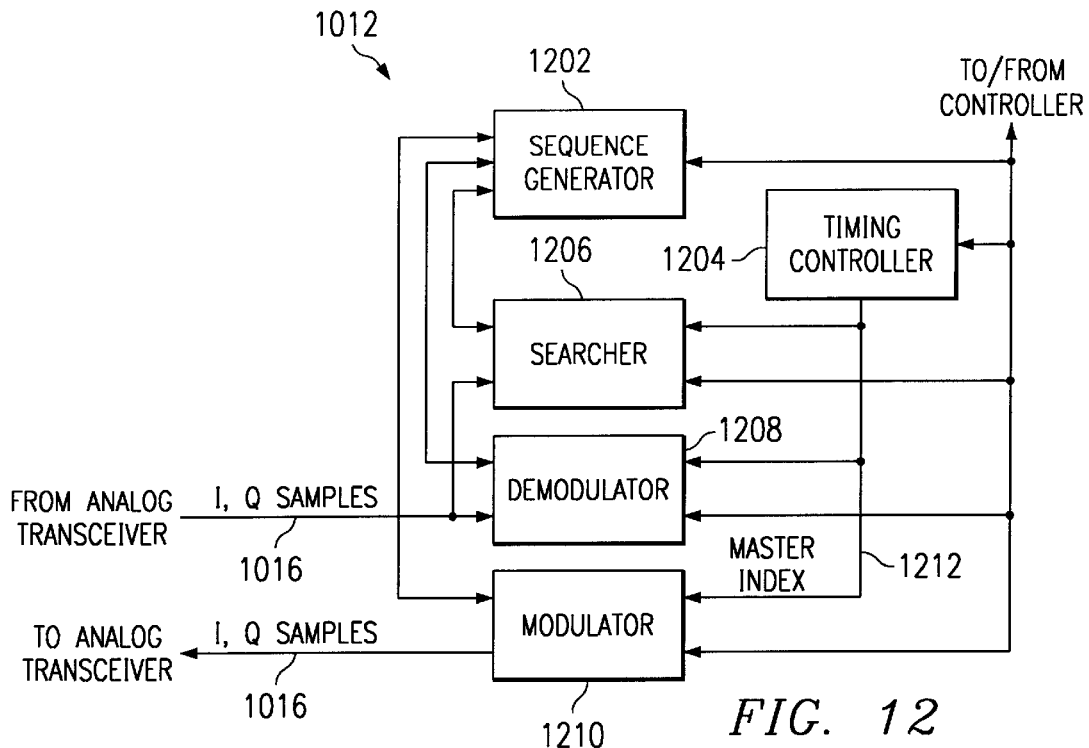
FIG. 12 is a schematic block diagram of components of a digital transceiver of the mobile station of FIG. 10.

FIG. 12 is a schematic block diagram of digital transceiver 1012 of FIG. 10, which may embody the present invention. Digital transceiver 1012 includes a sequence generator 1202, a timing controller 1204, a searcher 1206, a demodulator 1208, and a modulator 1210, coupled as indicated. As indicated in FIG. 12, demodulator 1208 receives I and Q samples from analog transceiver 1010 (FIG. 10), 10), whereas modulator 1210 generates and passes along I and Q samples to analog transceiver 1010 (FIG. 10). Each of the components of digital transceiver 1012 are described further in the following drawings. More particularly, additional components of timing controller 1204 are described below in relation to FIGS. 13 and 14; additional components of sequence generator 1202 are described below in relation to FIGS. 15A, 15B, 15C, and 15D; additional components of searcher 1206 are described below in relation to FIGS. 16 and 17; additional components of demodulator 1208 are described below in relation to FIGS. 18, 19, and 20; additional components of modulator 1210 are described below in relation to FIGS. 21 and 22. Where not specified otherwise, the components are based upon well-known logic circuits including finite state machines, comparators, counters, multiplexers, etc.

Figure 13:
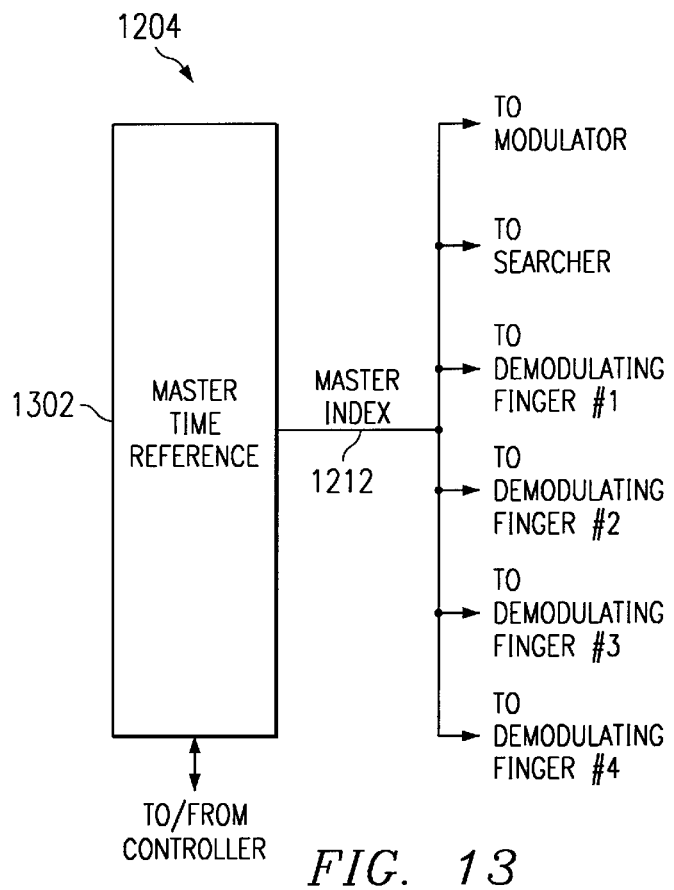
FIG. 13 is a block diagram of a timing controller of FIG. 12.

FIG. 13 is a block diagram of timing controller 1204 of FIG. 12. In general, timing controller 1204 is operative to generate a master time reference or count ("master index") for mobile station 1004. Timing controller 1204 includes a master time reference 1302 to provide this master index. The master index is changed at a rate at least equal to the chip rate of the CDMA system (i.e., 1,2288 MHz). The master index is routed to several components as indicated, such as modulator 1210 (FIG. 12), searcher 1206 (FIG. 12), and one or more fingers of demodulator 1208 (FIG. 12). Controller 1014 (FIG. 10) is coupled to master time reference 1302 for controlling its timing.

Figure 14:
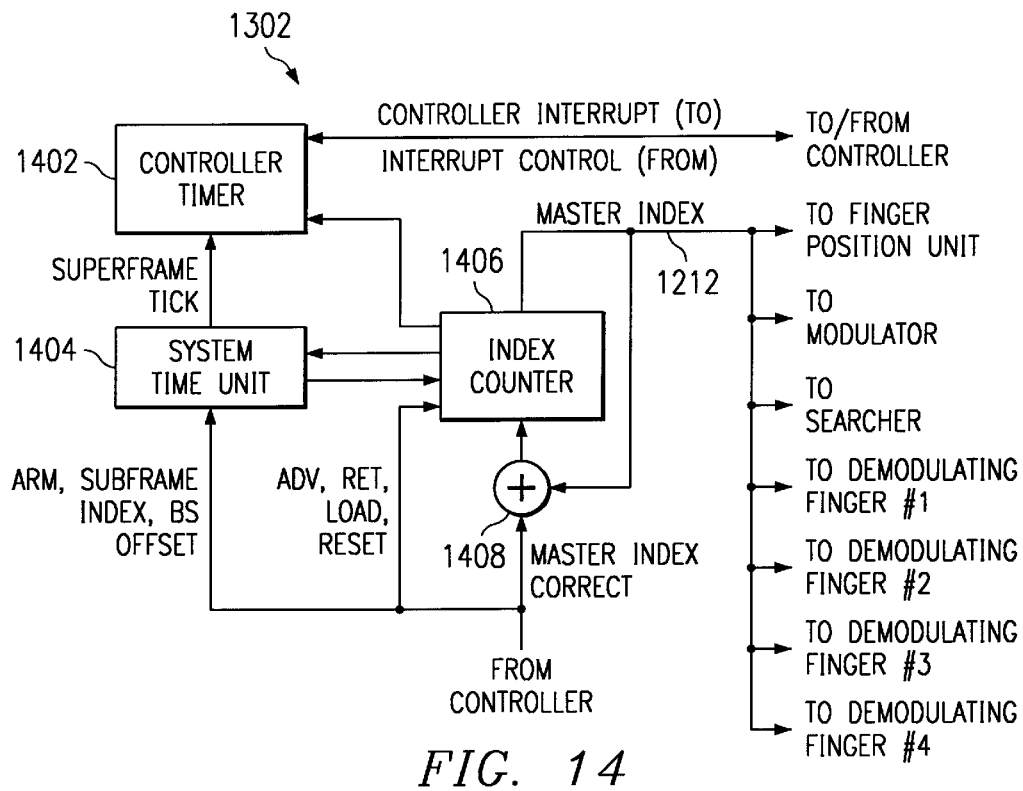
FIG. 14 is a schematic block diagram of a master time reference of the timing controller of FIG. 13.

FIG. 14 is a schematic block diagram of master time reference 1302 of FIG. 13. Master time reference 1302 includes a controller timer 1402, a system time unit 1404, an index counter 1406, and an adder 1408. Like all other adders described in connection with digital transceiver 1012, adder 1408 employs modulo addition techniques.

Index counter 1406 provides a master index or count at an output 1212. The master index is fed to various components of digital transceiver 1012 (FIG. 10) as indicated. Index counter 1406 has an input which is the sum of the master index and a master index correct signal from controller 1014. Controller 1014 is also coupled to index counter 1406 to provide load and reset signals when appropriate and to advance and retard index counter 1406, described in detail below. Controller timer 1402 is coupled to controller 1014 (FIG. 10) for generating periodic interrupts thereto (e.g., at 10 msec intervals), and for receiving interrupt control data to establish the interrupt.

Preferably, all index counters described herein, such as the master counter (index counter 1406), are at least 5-bit binary counters which provide a count from 0 to $2^{15}-1$ (32,767). The current count of the binary counter is incremented by binary one in response to each clock signal (and each chip period). Once the counter reaches 32,767, it rolls over to zero. Thus, like all other counters described herein, the master counter comprises a counter that counts at the chip rate and rolls over at the length of the PN sequence −1. When appropriately aligned, the master counter rolls over at the beginning of the nominal PN sequence.

Figure 15B:
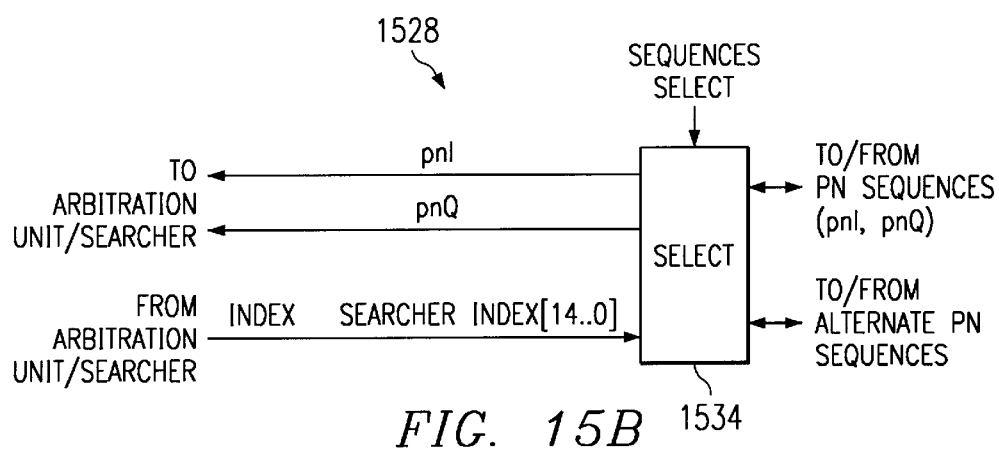
FIG. 15B is a diagram of a sequence controller portion associated with a "searcher state" of a searcher controller of FIG. 15A.
Figure 15A:
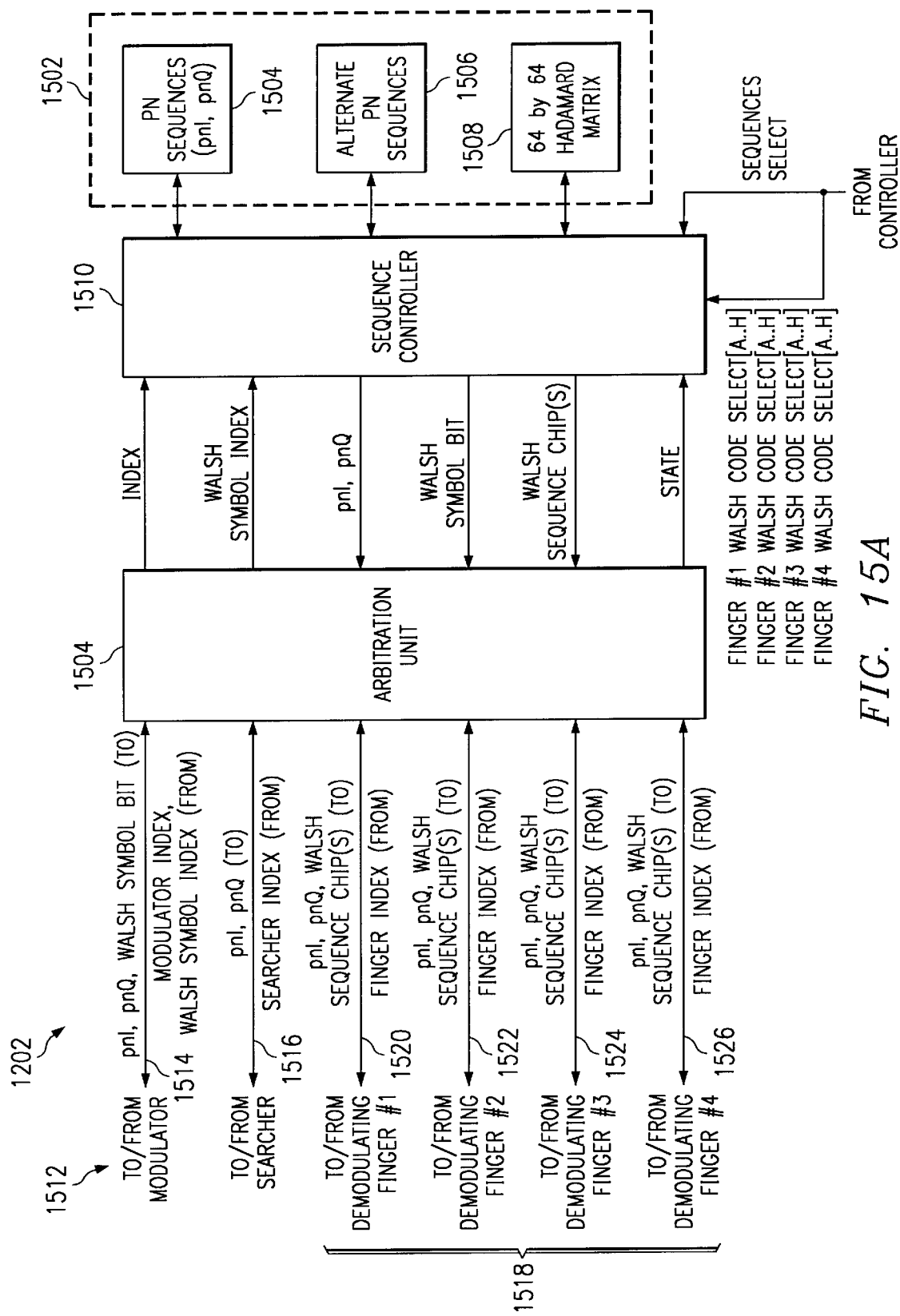
FIG. 15A is a schematic block diagram of a sequence generator of the digital transceiver of FIG. 12.
Figure 15C:
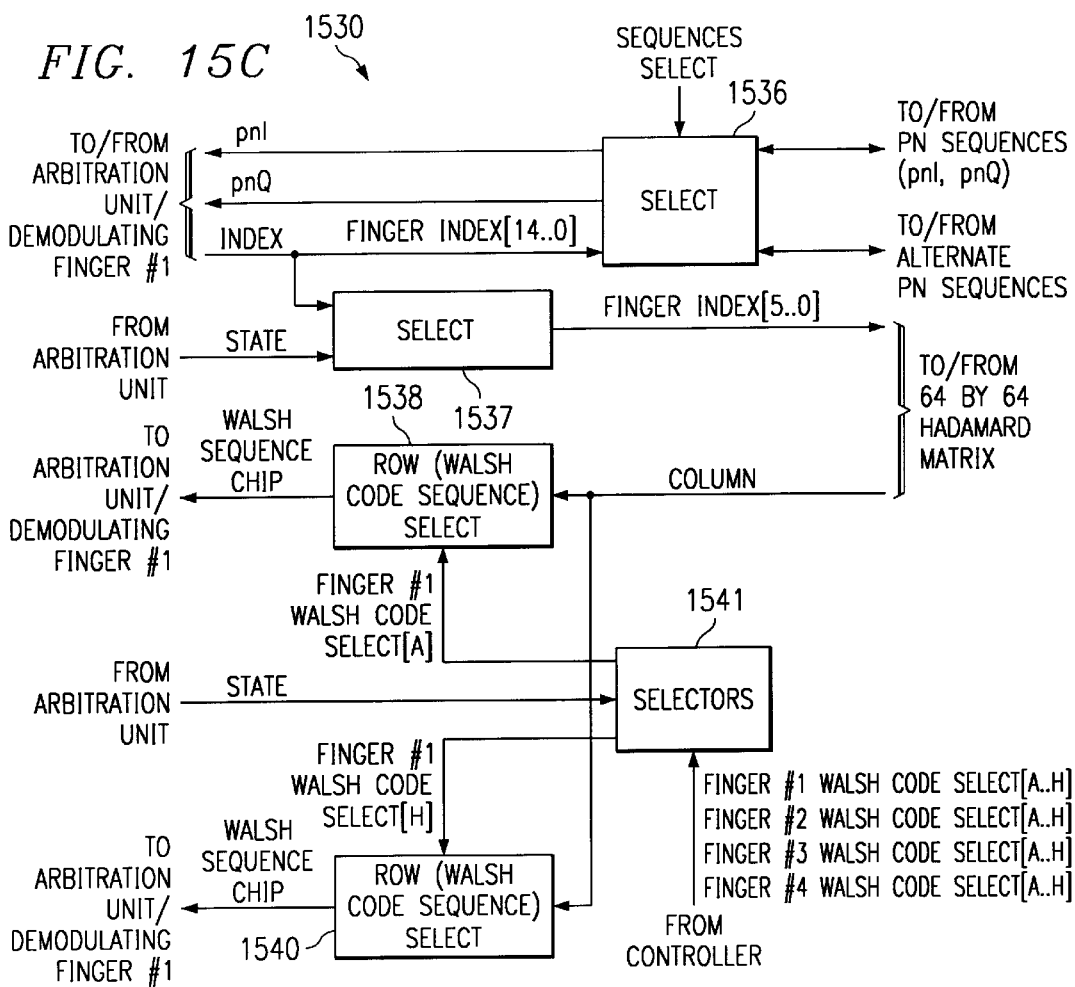
FIG. 15C is a schematic block diagram of a sequence controller portion associated with a "demodulating finger state" of the searcher controller of FIG. 15A.

FIG. 15A is a schematic block diagram of sequence generator 1202 of FIG. 12. Sequence generator 1202 includes a data access module 1502, an arbitration unit 1504, and a sequence controller 1510. Various signals are provided to and from arbitration unit 1504 through a plurality of lines 1512. Lines 1512 are connected to a variety of components: the modulator is coupled to arbitration unit 1504 via a line 1514; the searcher is coupled via a line 1516; and the demodulating fingers are coupled via lines 1518, which include lines 1520, 1522, 1524 and 1526 associated with demodulating fingers 1, 2, 3 and 4, respectively.

Data access module 1502 may be viewed as a number of submodules, such as a data access module 1504, a data access module 1506, and a data access module 1508. Data access module 1504 can provide at its outputs two PN sequences, namely the PN I sequence and the PN Q sequence (IS-95), and data access module 1508 can provide at its outputs Walsh code and symbol bits of a 64-by-64 Hadamard matrix. Although showing the 64-by-64 matrix, data access module 1502 may alternatively provide at its outputs any suitable N-by-N Hadamard matrix, such as a 128-by-128 or 256-by-256 Hadamard matrix. Data access module 1506 can provide any alternative PN sequences (for example, IS-2000 PN sequence). Controller 1014 (FIG. 10) is coupled to sequence controller 1510 for the appropriate selection of sequences.

data access module 1502 may consist of portions that utilize memory or known combinatorial logic. Preferably, one or more of data access modules 1504, 1506 and 1508 comprises memory for storage of the data sequences. The memory is preferably a non-volatile memory such as a read-only memory (ROM). A ROM may be programmed with the sequence(s) during its manufacturing process. In one embodiment each one of data access modules 1504, 1506, and 2508 is a separate single ROM having a single addressable input for data sequence access. In another application, data access modules 1504 and 1506 are separate ROMs, and data access module 1508 is a combinatorial logic circuit.

Depending on the application, however, any suitable memory may be used and programmed when appropriate. For example, the memory may be a PROM, an EPROM, an EEPROM, or flash memory. In even other applications, the memory may be a volatile memory such as RAM where the data sequence is stored when appropriate. Using the RAM, the data sequence may be generated prior to its storage (e.g., by the controller or processor) using the appropriate function associated therewith.

Arbitration unit 1504 manages the signals to and from lines 1512 and signals to and from sequence controller 1510. More particularly, arbitration unit 1504 receives such a request, it passes information relating to the request (e.g., an index offset) to sequence controller 1510. Arbitration unit 1504 also selects the appropriate state of sequence controller 1510 based on which component made the request. In this embodiment, sequence controller 1510 has seven states: a "searcher state," a "demodulator state" for each of four demodulating fingers, and a "modulator state." The searcher, demodulator, and modulator states are described in relation to FIGS. 15B, 15C and 15D, respectively.

It is worth noting that data access module 1502 may be advantageously powered down in between data sequence accesses. For example, sequence controller 1510 or arbitration unit 1504 may provide signals to data access module 1502 to power down after all requests have been serviced. Once data access module 1502 needs to be accessed again, it is powered back up and all requests are serviced in a grouped fashion, one at a time, at substantially the same time again.

FIG. 15B is a diagram showing a sequence controller portion 1528, which corresponds to the "searcher state" of sequence controller 1510 of FIG. 15A. Sequence controller portion 1528 assists in providing the appropriate PN sequences from data access module 1502 to searcher 1206. Since only searcher 1206 is involved here, Walsh sequence/symbol bits are not necessary and need not be accessed. In general, the searcher index from index counter 1704 (FIG. 17) is provided to data access module 1502 and the appropriate PN I and Q bits are returned. Controller 1014 can select from either data access module 1504 and 1506 (e.g., IS-95 or IS-2000 PN sequences). The controller makes this decision based on the requirements for the system, for example, based on control data stored in memory indicating which system data sequence is to be used.

To obtain the proper Walsh sequence chip, the proper row of the column information must be selected; which row to select depends upon the desired channel to decode. Controller 1014 provides the desired channel selection information to selector 1541. The channel information is passed by selector 1541 to the appropriate and available Walsh code row selector. A single row of the column data is selected based on that channel information. Thus, the appropriate Walsh sequence chip is selected. As apparent, an entire Walsh code having a plurality of Walsh sequence chips may be generated as the finger index changes. Other suitable codes, such as well-known Gold Codes used in Wideband CDMA (WCDMA) systems, may be made available for access in a similar manner.

In addition, Quasi-orthogonal functions (QOFs) may be utilized in connection with the Walsh codes in a similar manner. When decoding channels which are transmitted using QOFs, controller 1014 provides an index associated with a unique QOF to selector 1541 along with the desired channel selection information described above (all such information being provided to selectors 1541 for each finger and for each active channel within each finger). The Walsh sequence chip may be inverted before being output from Walsh code row selectors 1538 and 1540, in response to an "invert" command from selector 1541 so as to provide for the generation of QOFs as described in the IS-2000 standard. The QOFs are executed using a bit-by-bit exclusive-OR operation between the existing and well-known Walsh sequences and certain "masking functions" of the same length. Such masking functions may include those 256 and 512-bit functions shown in FIG. 15F, which are further specified in the IS-2000 standard referenced herein. The masking functions are stored in selector 1541. Selector 1541 receives the finger index and the state information and, for each active channel, selects the bit of the appropriate masking function corresponding to the finder index. Selector 1541 supplies such bit as an invert or exclusive-OR command to the appropriate selector (e.,g. 1538 or 1540).

Figure 15D:
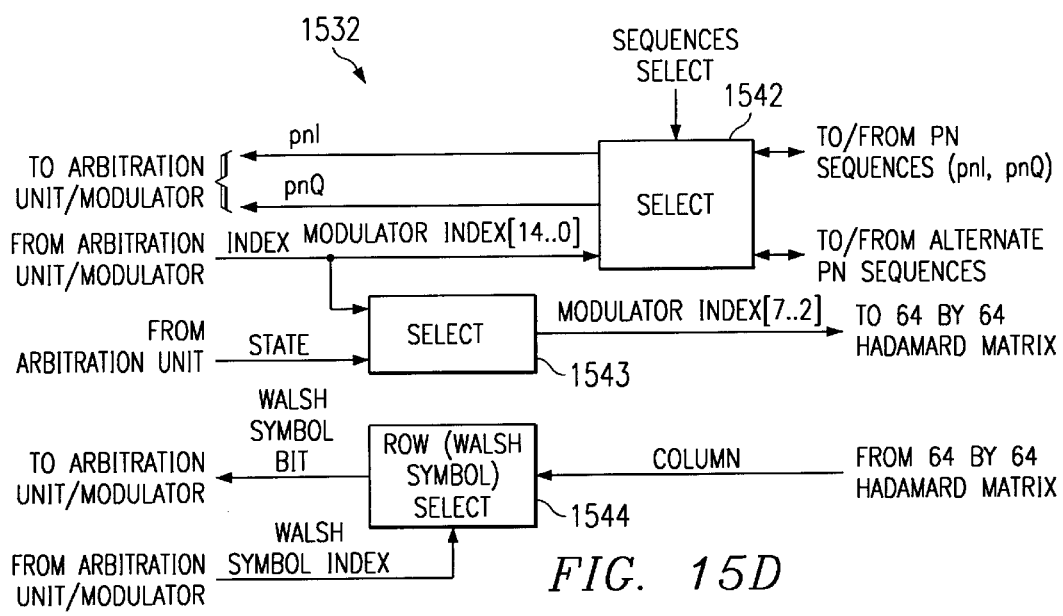
FIG. 15D is a diagram of a sequence controller portion associated with a "modulator state" of a searcher controller of FIG. 15A.
Figure 15E-1:
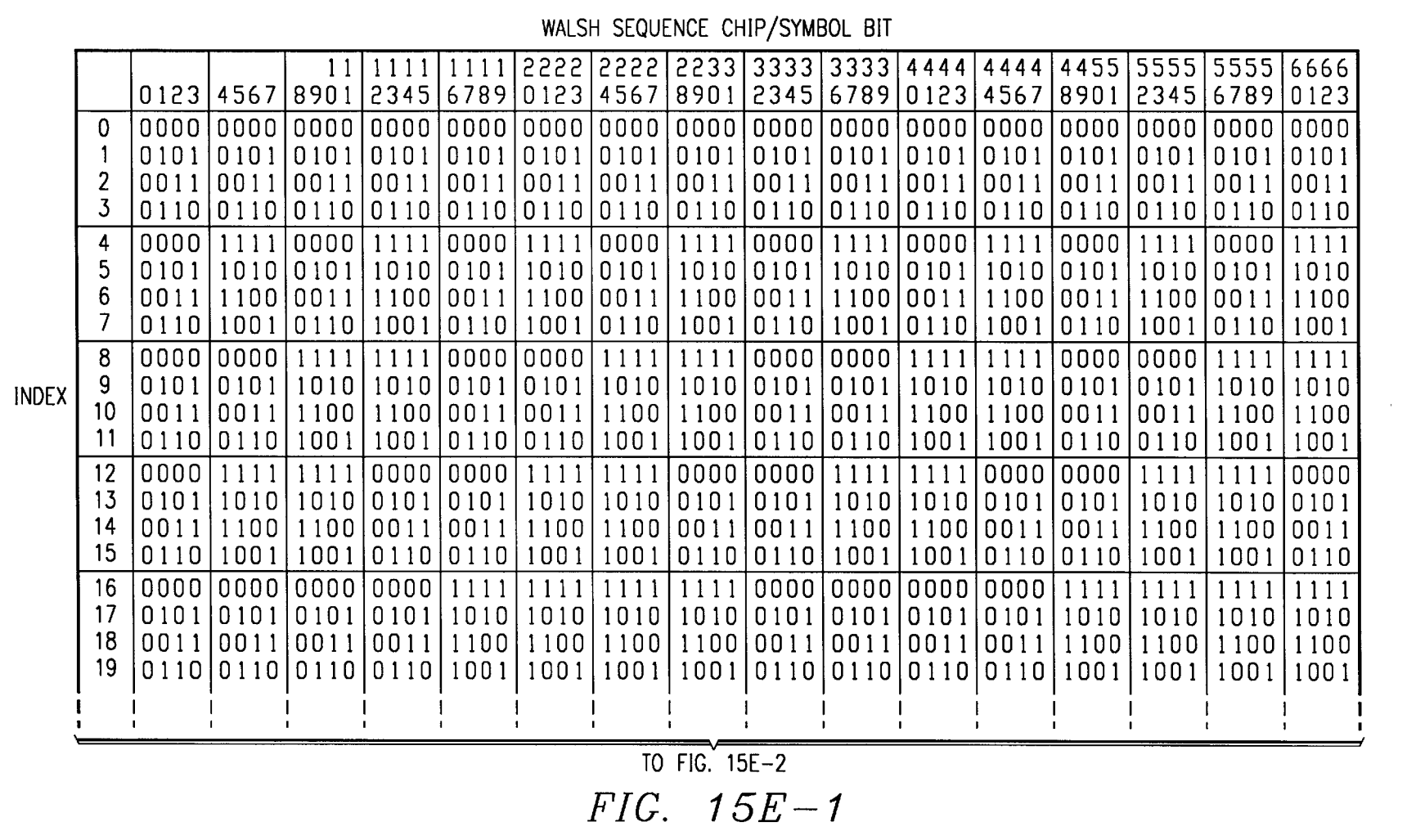
Figure 15E-2:
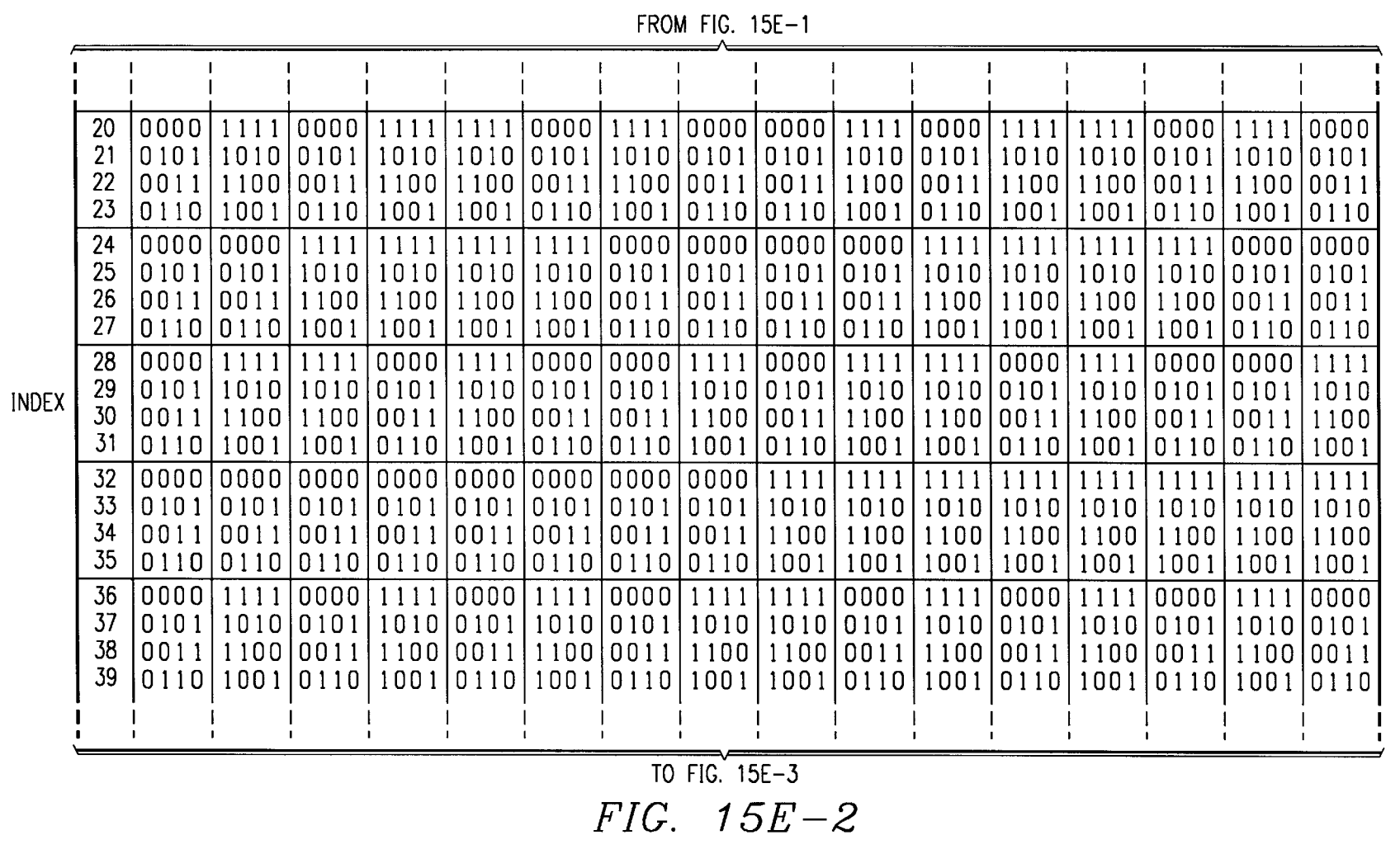
Figure 15E-3:
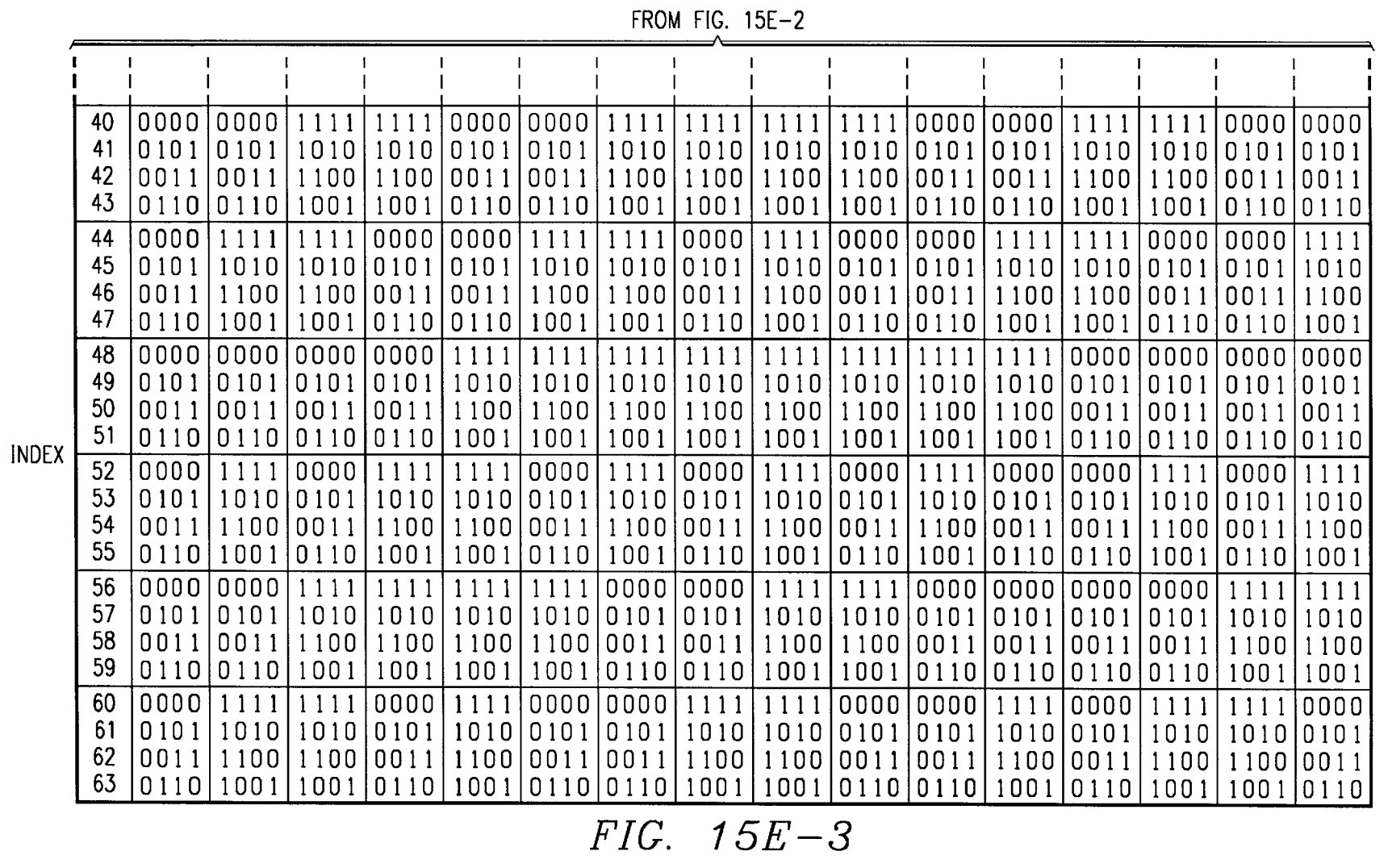

FIG. 15D is a sequence controller portion 1532 which represents the "modulator state" of sequence controller 1510 of FIG. 15A. Sequence controller portion 1532 includes a selector 1542, a selector 1543, and a Walsh code row selector 1544. The same approach described above is used for obtaining the I and Q PN sequences from data access module 1502.

As indicated in FIG. 15D, a modulator index represented by bits 14 through 0 is passed to selector 1542 to obtain the appropriate PN sequences from the memory. For modulation, Walsh symbol bits are needed in addition to the PN sequence. This is performed in a similar manner to that described in relation to FIG. 15C and the Walsh sequence chips. To select the appropriate column from the 64-by-64 Hadamard Matrix, bits 7 through bits 2 of the modulator index are used to access data access module 1502. (This is the same as dividing the modulator index by four, and taking modulo 64 of that result.) The appropriate column (64 bits) is received at Walsh code row selector 1554. To obtain the appropriate row bit needed for modulation, a Walsh symbol index is passed from modulator 1210 to Walsh code row selector 1554.

Figure 16:
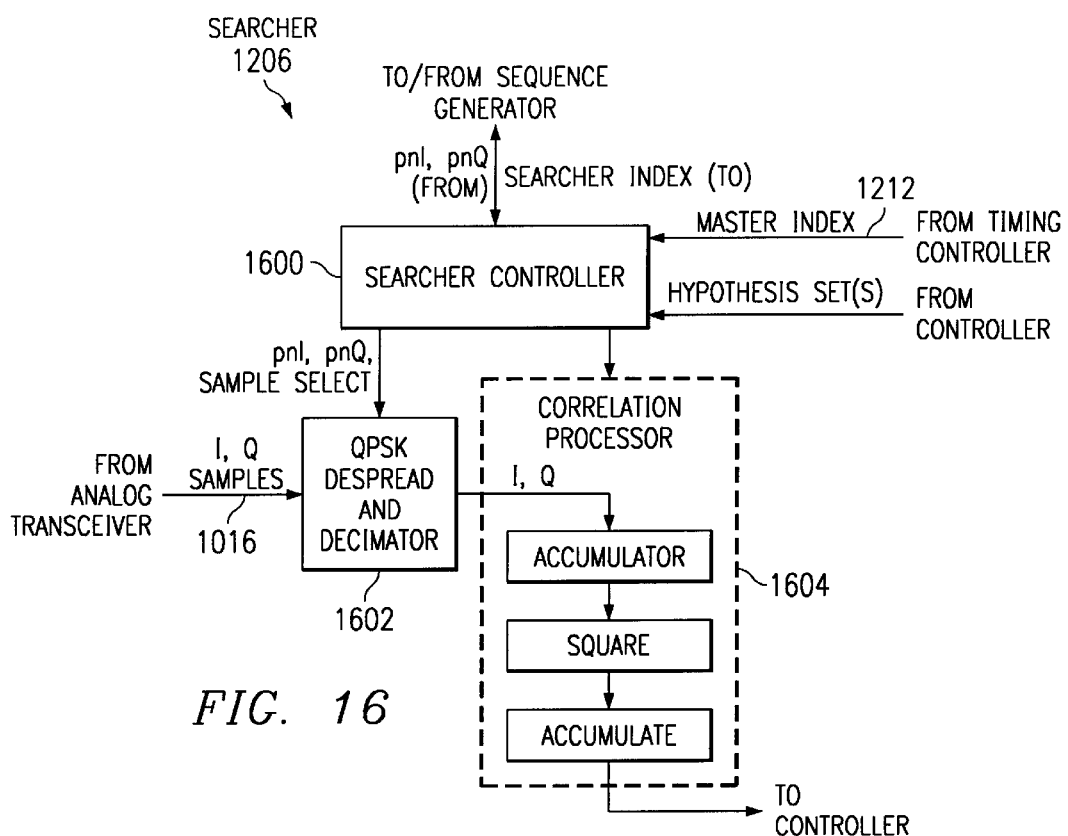
FIG. 16 is a schematic block diagram of a searcher of the digital transceiver of FIG. 12.

FIG. 16 is a schematic block diagram of searcher 1206 of FIG. 12. Searcher 1206 includes searcher controller 1600, a QPSK despreader and decimator 1602, and a correlation processor 1604 coupled as shown. QPSK despreader and decimator 1602 as well as correlation processor 1604 are well-known conventional components. QPSK despreader and decimator 1602 receives I and Q samples from analog transceiver 1010 at 1016. QPSK despreader and decimator 1602 also receive PN I and Q bits as well as a sample select signal from searcher controller 1600. The I and Q results are passed to correlation processor 1604. Correlation processor 1604 includes well-known accumulate-square-accumulate functionality as indicated. The results of correlation processor 1604 are passed along to controller for further processing.

Figure 17:
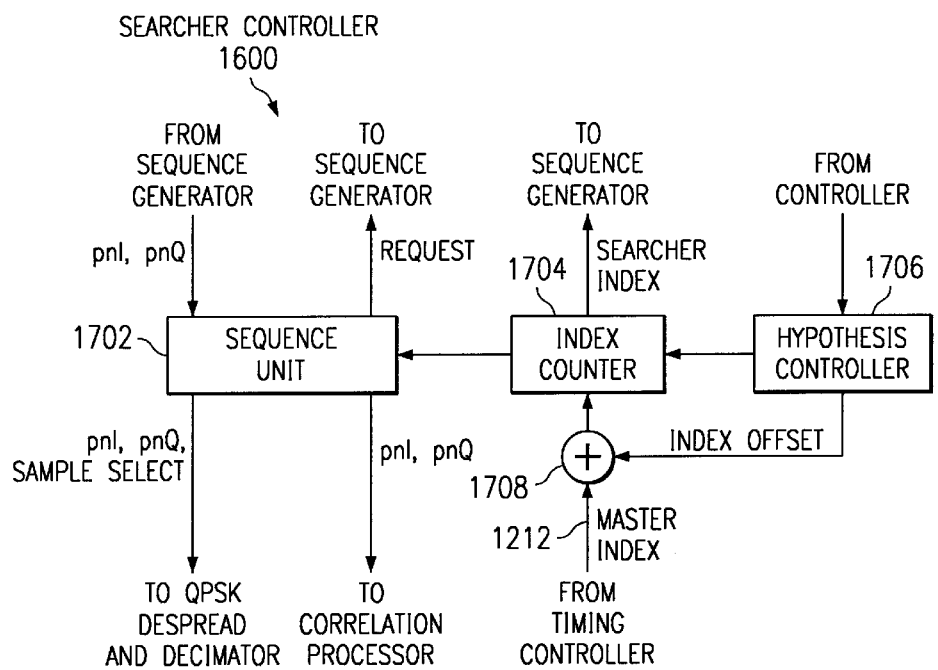
FIG. 17 is a schematic block diagram of a searcher controller of the searcher of FIG. 16.

FIG. 17 is a schematic block diagram of searcher controller 1600 of FIG. 16. Searcher controller 1600 includes a sequence unit 1702, an index counter 1704, a hypothesis controller 1706, and an adder 1708. Controller feeds hypothesis controller 1706, with appropriate hypothesis set information. Each hypothesis set is associated with a number of index offsets used for searching. The master index and the selected index offset are summed at adder 1708 and fed into index counter 1704. Accordingly, index counter 1704 feeds the counter information (here, the searcher index) to sequence generator 1202 for the selection of the appropriate PN I and Q bits.

Figure 18:
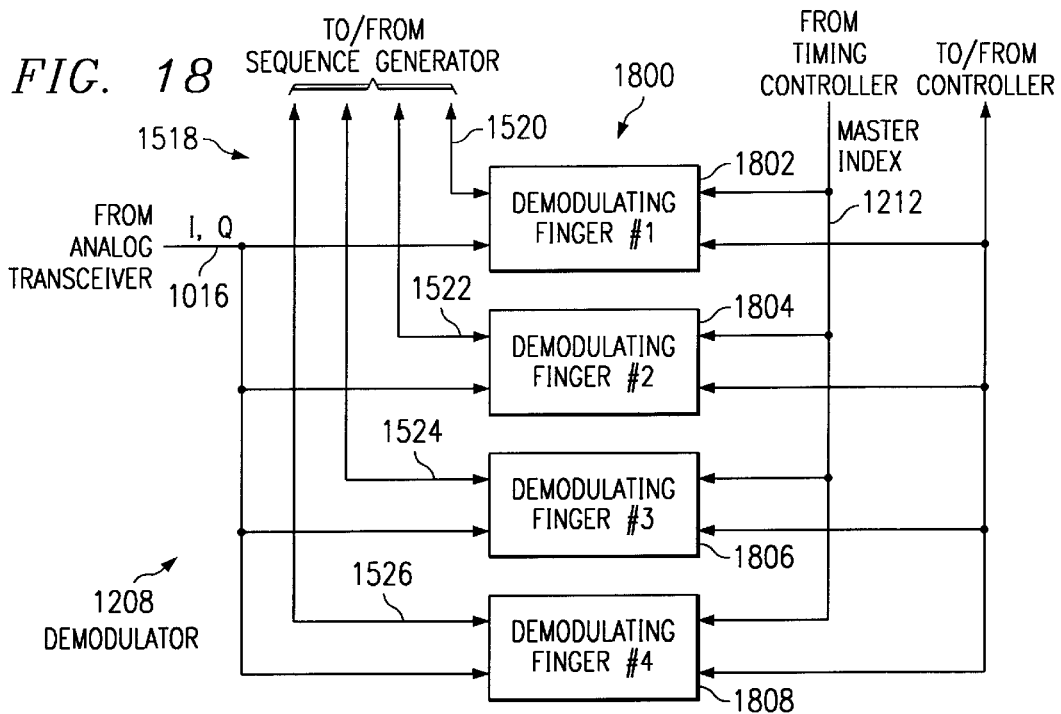
FIG. 18 is a block diagram of a demodulator of the digital transceiver of FIG. 12.

FIG. 18 is a schematic block diagram of demodulator 1208 of FIG. 12. Demodulator 1208 includes a plurality of demodulating fingers 1800. In this embodiment, demodulation fingers 1800 include four demodulating fingers: demodulating fingers 1802, 1804, 1806 and 1808. Each demodulating finger receives I and Q samples from analog transceiver 1010 at 1016. Each demodulating finger is coupled to sequence generator 1202 of FIG. 12 to request and receive its unique sequence bits. Demodulating finger 1802 is coupled to sequence generator 1202 via line a 1520; demodulating finger 1804 is coupled to sequence generator 1202 via line 1522; demodulating finger 1806 is coupled to sequence generator 1202 via a line 1524 and demodulating finger 1808 is coupled to sequence generator 1202 via a line 1526. The master index is provided to each demodulating finger at 1212. The controller 1014 is also coupled to each demodulating finger for control and processing, and also to read a particular state of a demodulating finger.

Figure 19:
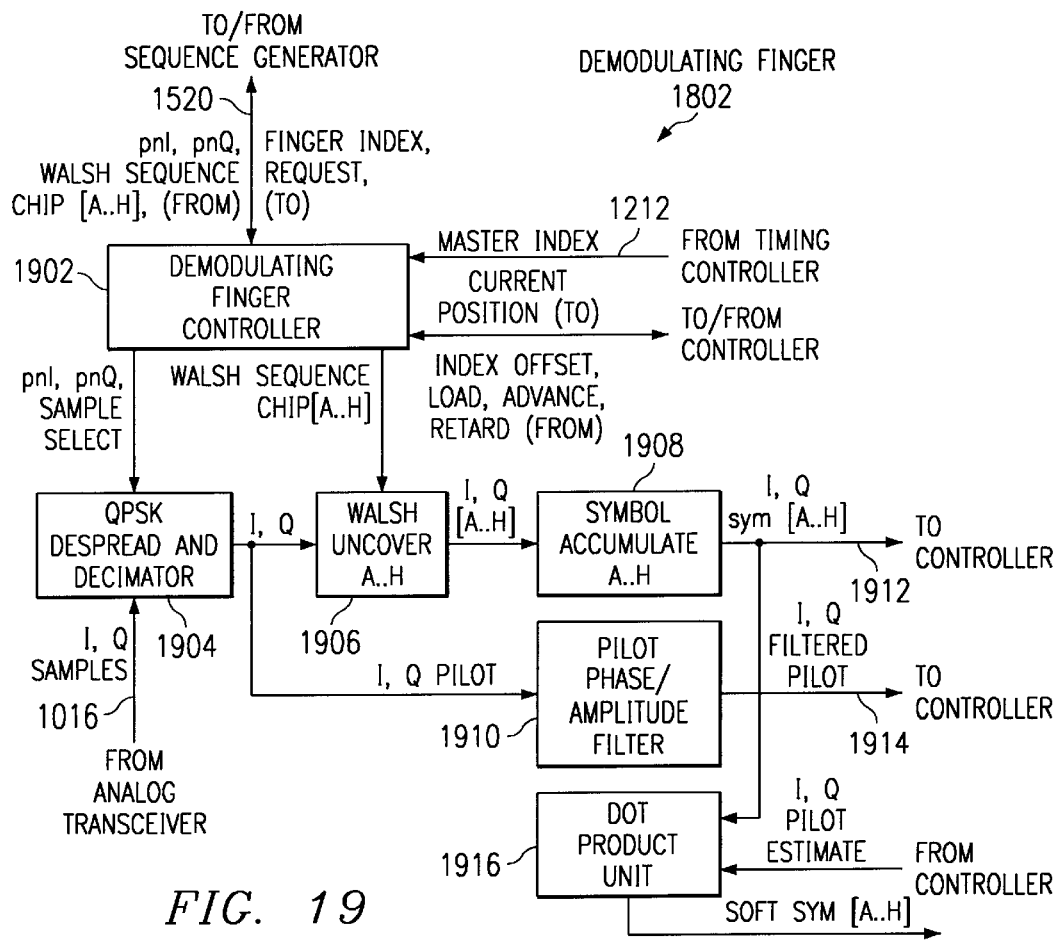
FIG. 19 is a schematic block diagram of a demodulating finger of the demodulator of FIG. 18.

FIG. 19 is a schematic block diagram of one of demodulating fingers 1800 of FIG. 18, namely demodulating finger 1802. Demodulating finger 1802 is representative of the other demodulating fingers 1800 of FIG. 18 in description. Demodulating finger 1802 includes a demodulating finger controller 1902, a QPSK despreader and decimator 1904, a plurality of Walsh uncovers 1906 (A through H), a plurality of symbol accumulators 1908 (A through H), a pilot phase amplitude filter 1910, and a dot product unit 1916. QPSK despreader and decimator 1904, The plurality of Walsh uncovers 1906, the plurality of symbol accumulators 1908, and pilot phase/amplitude filter 1910 are well-known conventional components.

QPSK despreader and decimator 1904 receives I and Q samples from analog transceiver 1010 at 1016. PN I an Q bits, as well as sample select signals, are fed from demodulating finger controller 1902 to QPSK despreader and decimator 1904. Demodulating finger controller 1902 also passes Walsh sequence chips into Walsh uncovers 1906. The output of Walsh uncovers 1906 is fed into symbol accumulators 1908, and the output of symbol accumulators 1908 is fed to controller 1014 at 1912 and to dot product unit 1916. The output of pilot phase/amplitude filter 1910 is fed into controller 1014 at 1914. Controller 1014 performs additional filtering of the I, Q filtered pilot data received from pilot phase/amplitude filter 1910. The output of this filtering operation is passed to dot product unit 1916 from controller 1014 as the I, Q pilot estimate. Dot product unit 1916 performs a dot product or inner product operation between the I, Q pilot estimate and each output pair I, Q sym [A..H]. The resulting scalar quantities "soft sym [A..H]" are fed to controller 1014.

Figure 20:
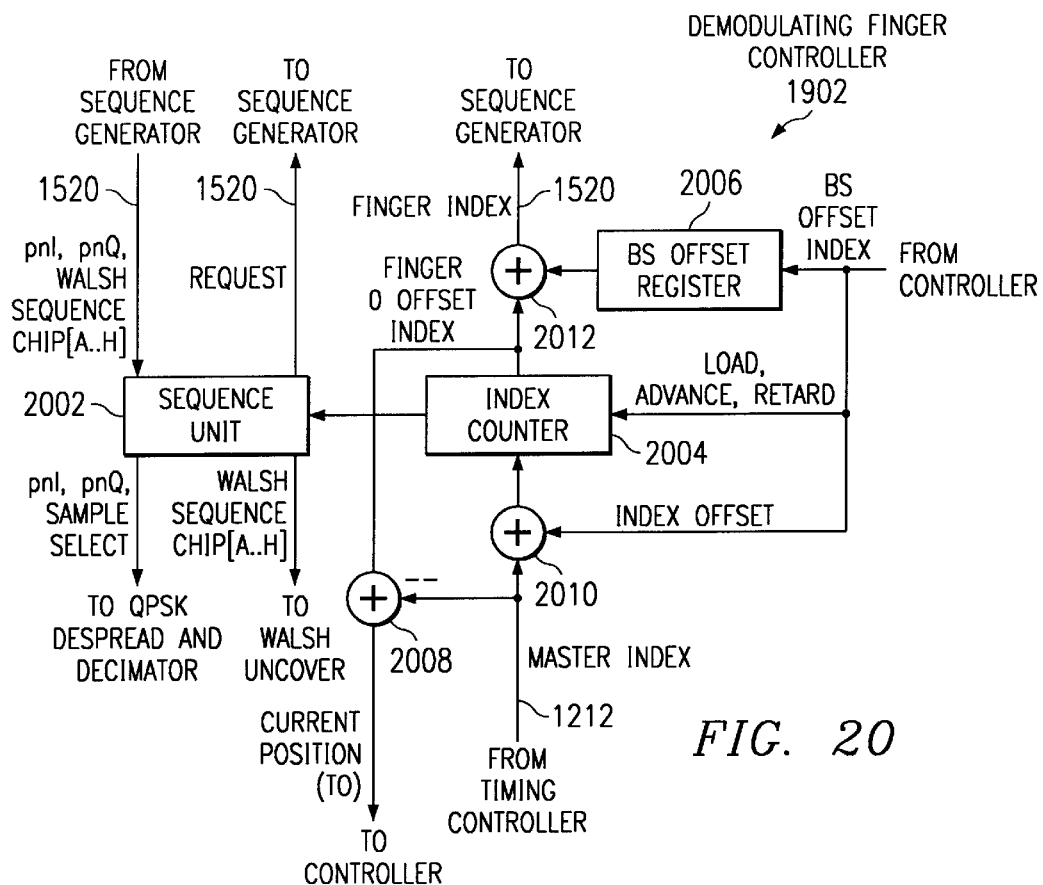
FIG. 20 is a schematic block diagram of a demodulating finger controller of the demodulating finger of FIG. 19.

FIG. 20 is a schematic block diagram of a demodulating finger controller 1902 of FIG. 19. Demodulating finger controller 1902 includes a sequence unit 2002, and index counter 2004, a base station offset register 2006, an adder 2008, and adder 2010, and an adder 2012. Controller 1014 is coupled to various components of demodulating finger controller 1902. Controller 1014 is coupled to base station offset register 2006 to load it with an appropriate base station index offset (e.g., 1, 2, 3, etc. Corresponding to an output at base station offset register 2006 of 64, 128, 192, etc., respectively). The output of index counter 2004 (the zero-offset of the finger) is added to the output of base station offset register 2006 by adder 2012. Controller 1014 is coupled to index counter 2004 to provide it with a load signal for loading, and to advance or retard index counter 2004 for more accuracy (as described in more detail below). The output of adder 2010 is fed into index counter 2004 and loaded when appropriate. Controller 1014 is coupled to adder 2010 to provide it with an index offset, which is summed with the master index from timing controller at 1212. The index offset is used to correct for signal delays, and is a number that is independent of the base station offset.

The output of adder 2012 (the finger index) is provided at 1520 to sequence generator 1202. Sequence unit 2002 sends the request for data sequence information to the sequence generator 1202. In response, the PN I and Q bits, as well as the Walsh sequence chips, are received at sequence unit 2001. The PN I and Q bits, as well as sample select signals, are passed from sequence unit 2002 to QPSK despreader and decimator 1904. The Walsh sequence chips are sent to Walsh uncovers 1906.

Controller 1014 is also coupled to an output of adder 2008, which has inputs coupled to the output of index counter 2004 and to the master index at 1212. The master index at 1212 is subtracted from the output of index counter 2004 to provide a current position of the finger to controller 1014. The position of index counter 2004 may be useful to controller 1014 for any number of reasons.

In one application, the state availability is useful for the determination of the earliest arriving finger based on the collective finger positions. The earliest arriving finger determination may be employed, for example, in the traffic channel mode described later below. As an example, suppose that a first finger is assigned to a base station offset of "64" and a second finger is assigned to a base station offset of "128." The fingers may have delays associated therewith, in this example the first finger may have a delay of "2" while the second finger has a delay of "1". Controller 1014 reads the positions for all of the fingers involved at the appropriate outputs, such as the output of adder 2008. Controller 1014 selects the finger having the least state value to be the earliest finger. Thus, in this example, the second finger is the earlier arriving one. Controller 1014 appropriately performs a correction of the master time as required to align the master time to the earliest finger.

In another application, controller 1014 reads the states of the fingers so as not to perform finger reassignment when it is unnecessary to do so. In the searcher operation (described in detail later below), search results associated with a set of index offsets are obtained. Upon receiving the results, controller 1014 reads the states of the fingers. Fingers that are currently demodulating in association with an index offset desired to be demodulated are not reassigned.

Figure 21:
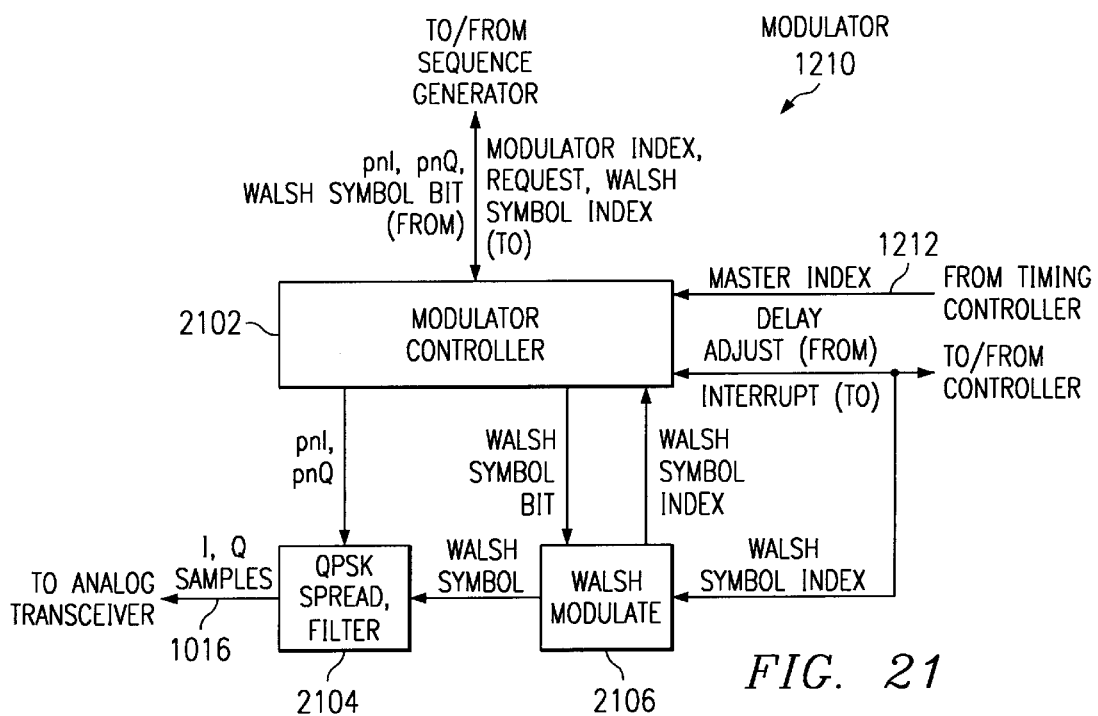
FIG. 21 is a schematic block diagram of a modulator of the digital transceiver of FIG. 12.

FIG. 21 is a schematic block diagram of modulator 1210 of FIG. 12. Modulator 1210 includes a modulator controller 2102, a QPSK spreader/filter 2104 and a Walsh modulator 2106. Controller 1014 is coupled to Walsh modulator 2106 and passes the appropriate Walsh symbol index thereto. Walsh Modulator 2106 passes the Walsh symbol index to modulator controller 2102. Modulator controller 2106 provides the modulator index and the Walsh symbol index to sequence generator 1202 when requesting data sequence bits. In response, sequence generator 1202 provides the appropriate data sequence bits, including the PN I and Q bits and the Walsh symbol bit. The PN I and Q bits are fed to QPSK spreader/filter 1016 and the Walsh symbol bits are fed to Walsh modulator 2106. Thus, Walsh modulator 2106 generates the appropriate Walsh symbol which is passed to QPSK spreader/filter 2104. QPSK spreader/filter 2104 generates the appropriate I and Q samples which are fed to analog transceiver 1010.

Figure 22:
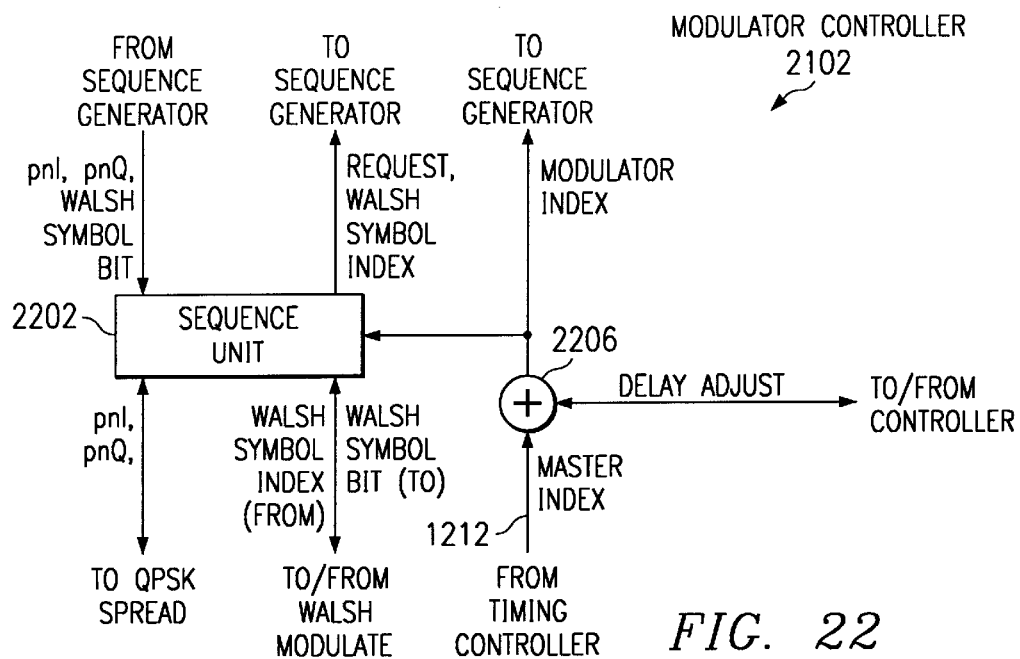
FIG. 22 is a schematic block diagram of a modulator controller of the modulator of FIG. 21.

FIG. 22 is a schematic block diagram of modulator controller 2101 of FIG. 21. Modulator controller 2102 includes a sequence unit 2202 and an adder 2206. The master index is fed to adder 2206 at 1212. The sum of the master index and an delay adjustment from controller 1014 is the modulator index, which is passed to sequence generator 1202.

Figure 29:
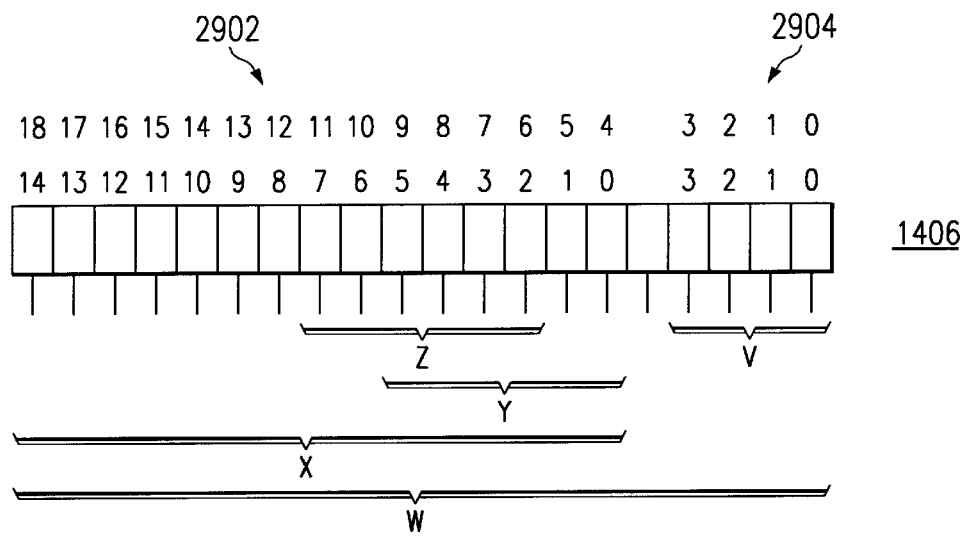
FIG. 29 is an illustration of a counter comprising a chip counter and a sub-chip counter.

As described earlier above, each of the counters may comprise a 15-bit binary counter which provides a count from 0 to 32.767 or $2^{15}-1$. Preferably, each index counter also comprises a sub-chip counter to provide more accuracy. Referring now to FIG. 29, such an exemplary counter is illustrated, and indicated as being index counter 1406 of the master time reference. As shown, each counter may comprise a chip counter 2902 and a sub-chip counter 2904. Here, index counter 1406 is a 19-bit counter (having bits 0 through 19), where sub-chip counter 2904 is represented by the four least significant bits (LSBs) (bits 0 through 3) and chip counter 2902 is represented by the remaining 15 bits (bits 4 through 18). Chip counter 2902 is clocked at the chip rate, or 1,2288 Mhz, while actually two sub-chip rates are achieved (one at 8 times the chip rate, and other at 16 times the chip rate). Thus, the main clock for the system is at 29,6608 megahertz (16 times the chip rate), which is divided to provide 9.8304 megahertz (8 times the chip rate). Nominally when the count for sub-chip counter 2904 reaches seven, it rolls over to zero and enables chip counter 2902 to increment its count. When the count for chip counter 2902 reaches $2^{15}-1$, it rolls over to zero.

FIG. 29 also shows the exemplary utilization of the counter outputs of each index counter: counter outputs represented by X(bits 0 through 14 of chip counter 2902) are utilized for PN I and Q sequence memory addressing; counter outputs represented by Y (bits 0 through 5 of chip counter 2902) are utilized for Walsh sequence chip addressing (demodulation); counter outputs represented by Z (bits 2 through 7 of the chip counter 2902) are utilized for Walsh symbol bit addressing (modulation); counter outputs represented by V (bits 0 through 3 of sub-chip counter 2904) are utilized for fine timing adjustment; and counter outputs represented by W (bits 0 through 18 of index counter 1406) correspond to the entire counter and are used in connection with most if not all other functions, including when adding, subtracting, reading the current "position" or state of the counter/data sequence, etc.

Figure 31:
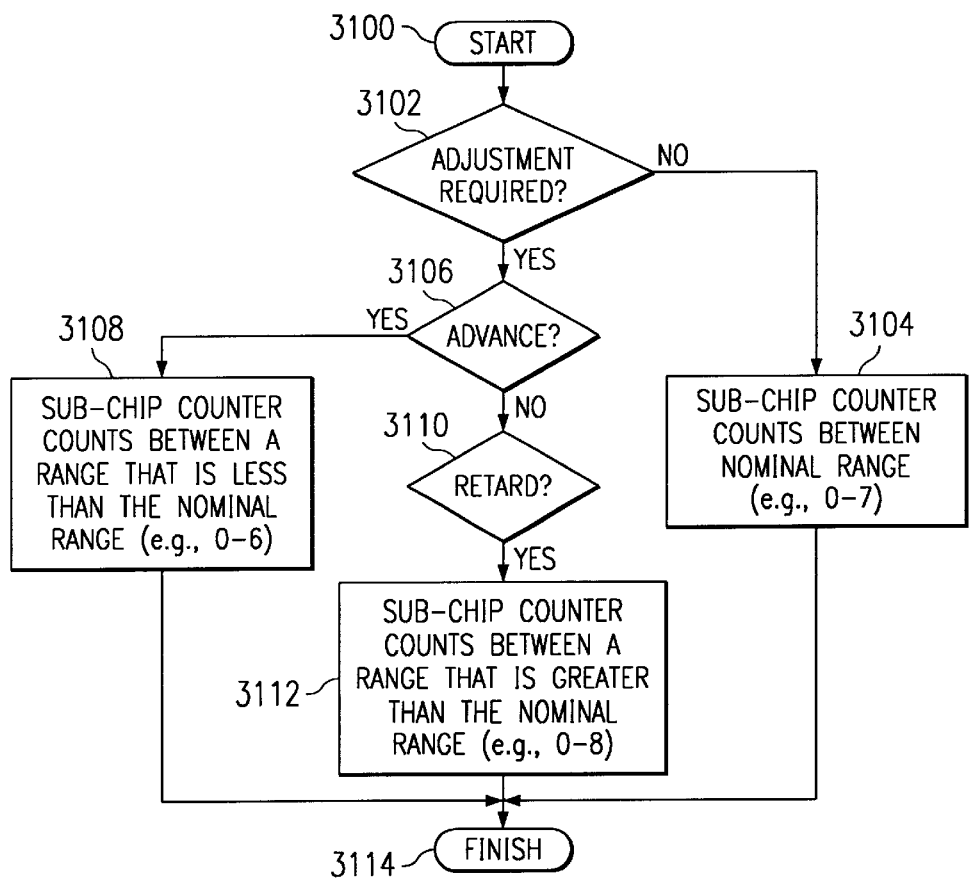
FIG. 31 is a flowchart describing a method of adjusting the sub-chip counter of FIG. 29.

Since master time reference 1302 (FIG. 14), searcher controller 1600 (FIG. 17) and demodulating finger controller 1902 (FIG. 20), each have separate index counters, controller 1014 can advantageously advance and retard those counters (and corresponding timings) separately and independently of one another. Controller 1014 controls each index counter to advance or retard on a sub-chip level using sub-chip counters associated therewith. FIG. 31 is a flow-chart describing a method of providing fine timing adjustment with use of an index counter, such as index counter 1406 described in relation to FIG. 29. The following description will refer to FIG. 30 as well, which shows two timelines A and B corresponding to advancing and retarding, respectively, Beginning at a start block 3100, the controller determines whether a timing adjustment is necessary (step 3102). If no adjustment is needed, the sub-chip counter is configured to count incrementally between a nominal range of values, such as a range between 0 and 7 (step 3104). This operation is represented by the first two "nominal" intervals of time-lines A and B of FIG. 30. If adjusting is needed, and more particularly is advancing is needed (step 3106), the sub-chip counter is configured to count incrementally between a range that is less than the nominal range, such as a range between 0 and 6 (step 3108). This operation is represented by the "advance" interval of timeline A of FIG. 30. If adjusting is needed, and more particularly if retarding is needed (step 3110), the sub-chip counter is configured to count incrementally between a range that is greater than the nominal range, such as between 0 and 8 (step 3112). This operation is represented by the "retard" interval of timeline B of FIG. 30.

The flowchart ends at a finish block 3114, but the method preferably repeats beginning again at step 3102. Although the method preferably repeats, advancing and retarding is only performed when necessary for adjustments due to changes in path delay. As mentioned above, each index counter is preferably operated in this manner in a separate and independent fashion.

QPSK despreaders and decimators 1602 and 1904 (e.g., in relation to FIGS. 16 and 19) select and operate upon particular I and Q samples in connection with this advancing and retarding. Sampling is performed with analog receiver 1010 (FIG. 10) at eight times the chip rate. Therefore, eight I samples and eight Q samples are received at, for example, QPSK despreader and decimator 1904 of FIG. 19. One objective of QPSK despreader and decimator 1904 (as well as the others) is to operate upon a selected "peak" sample, or at the sample corresponding to the middle of a received chip.

Figure 30A:
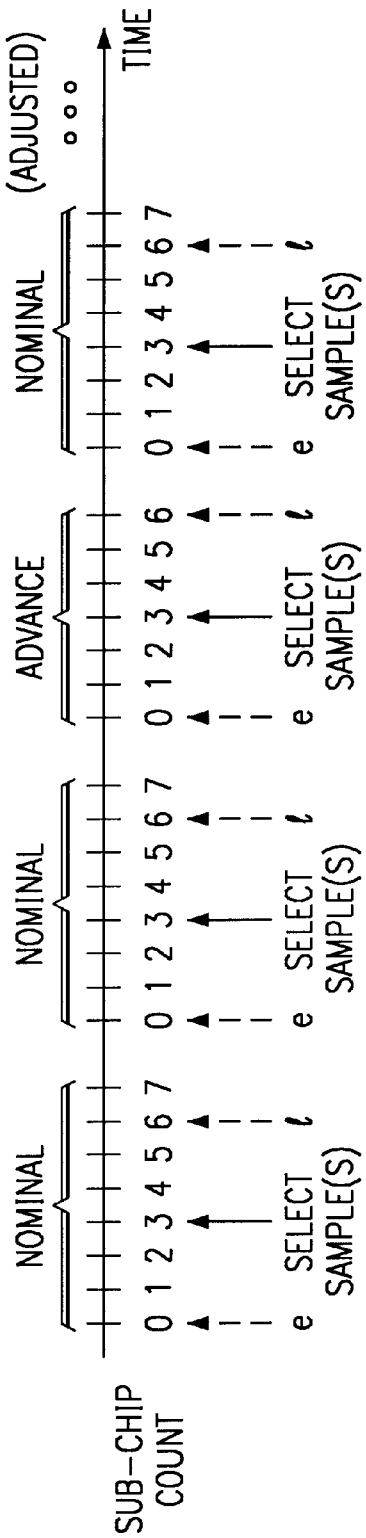
FIG. 30 are timeline illustrations relating to the method of adjusting the sub-chip counter of FIG. 29.
Figure 30B:
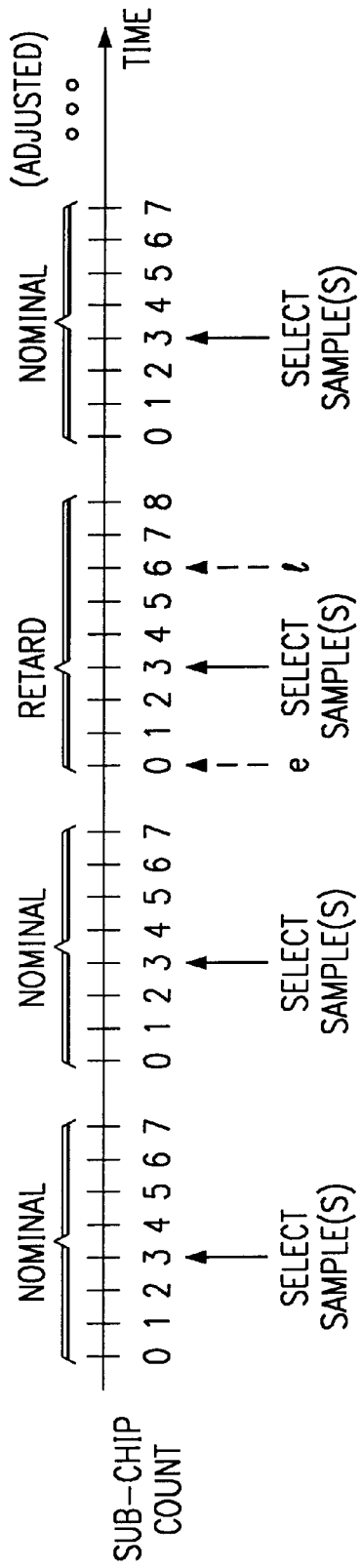

To do this, demodulating finger controller 1902 and QPSK despreader and decimator 1904 are operative in connection with sub-chip counter 2904 of FIG. 29 and the method described in relation to FIG. 31. Having the current counter position including the sub-chip count, demodulating finger controller 1902 associates a predetermined and fixed sub-chip counter value that corresponds to the appropriate peak sample to be selected. As shown in FIG. 30, the fixed sub-chip counter value in this embodiment is three (three in a count of eight). Thus, a single I sample and a single Q sample received at a time when sub-chip counter 2904 has a value of three are those samples selected in despreading the waveform.

Thus, when sub-chip counter 2904 is advanced by decreasing the sub-chip counter range (step 3108 of FIG. 31), the framework of the next chip sample set is advanced in time by one sample so that the next selected sample is advanced in time relative to the signal boundaries of the next chip. Likewise, when sub-chip counter 2904 is retarded by increasing the sub-chip counter range (step 3112 of FIG. 31), the framework of the next chip sample set is delayed in time by one sample so that the next selected sample is delayed in time relative to the signal boundaries of the next chip. The functions of time monitoring, advancing, and retarding are performed continuously in a mobile environment to maintain precise timing.

As indicated in FIG. 30, early and late samples, designated by small letters "E" and "L," are also associated with predetermined and fixed sub-chip counter values. The E and L samples are selected in a manner similar to that described above in relation to the peak samples. In this embodiment, the early sample is associated with a fixed sub-chip counter value of six. The early and late samples are used in connection with well-known "delay lock loop" techniques. As is well known, delay lock loop techniques may involve error detecting by subtracting energy corresponding to the early and late samples, filtering the result, and applying threshold detection.

In addition to other novel aspects described, interrupts to controller 1014 are preferably generated and based on the master time reference index counter. Referring back to FIG. 14, controller timer 1402 is coupled to the controller as well as to index counter 1406. Here, the purpose of controller timer 1402 is to provide a periodic interrupt to controller 1014. Controller 1014 sets up the interrupt period by setting controller timer 1402 with a desired interrupt period.

Controller timer 1402 receives and accumulates periodic pulses from index counter 1406 so as to determine when to issue an interrupt to controller 1014. The accumulator of timing controller 1402 is reset upon receiving a superframe tick from system time unit 1404. System time unit 1404 receives a 26.67 msec frame pulse from index counter 1406 at each 26.67 msec frame boundary, corresponding to each rollover of index counter 1406. System time unit 1404 maintains a sub-frame state counter, where each one of three states of such counter corresponds to one of three 26.67 msec frames of a 80 msec superframe as is well known in an IS-95 system. Such sub-frame counter is initialized for alignment to the base station's reference of 80 msec frames through the process of system time correction (as described later below).

The superframe tick from system time unit 1404 is provided upon a third rollover of the sub-frame state counter. Such rollover is aligned to the 80 msec superframe boundary, a superframe boundary being the boundary of both 20 msec data frame and the boundary of a 26.67 msec frame as is well-known. Corrections to index counter 1406 through advance and retard operations (described above) causes associated advance and retard corrections to the periodic pulses from index counter 1406 to controller timer 1402, thereby facilitating correct phase alignment of the interrupt to controller 1014 with master time. Thus, an interrupt can be provided to controller 1014 which is locked in phase with the master time, even when the master time is being corrected for alignment to the early finger (as described earlier above).

Preferably, such an interrupt is provided to controller 1014 one or more times per 20 msec data frame, Controller 1014 may accumulate or count such interrupts so as to maintain System Time to an accuracy equal to the interrupt period programmed by controller 1014. System Time must be maintained with the IS-95 system to a resolution of approximately a few chips, including the range required to determine time of day, date, and year. Therefore, the preferred embodiment maintains system time in increments of 80 msec within controller 1014, with a resolution below 80 msec within the 3-state counter of system time unit 1404 and a resolution below 26.67 msec within index counter 1406.

In addition to other novel aspects, a method of synchronizing a time reference of a mobile station to that of a base station is described. System time correction is utilized when synchronizing the digital transceiver's internal time reference to the base station's time reference. For an IS-96 system, the master time must be synchronized with the phase of the Nominal PN Sequence at the base station. Because the master time is maintained at a resolution of roughly a chip or 814 nanoseconds, but may be maintained with a time range of only 26.67 msec, other means of maintaining a time reference at the digital transceiver are required to achieve more precise synchronization with a base station.

Figure 24:
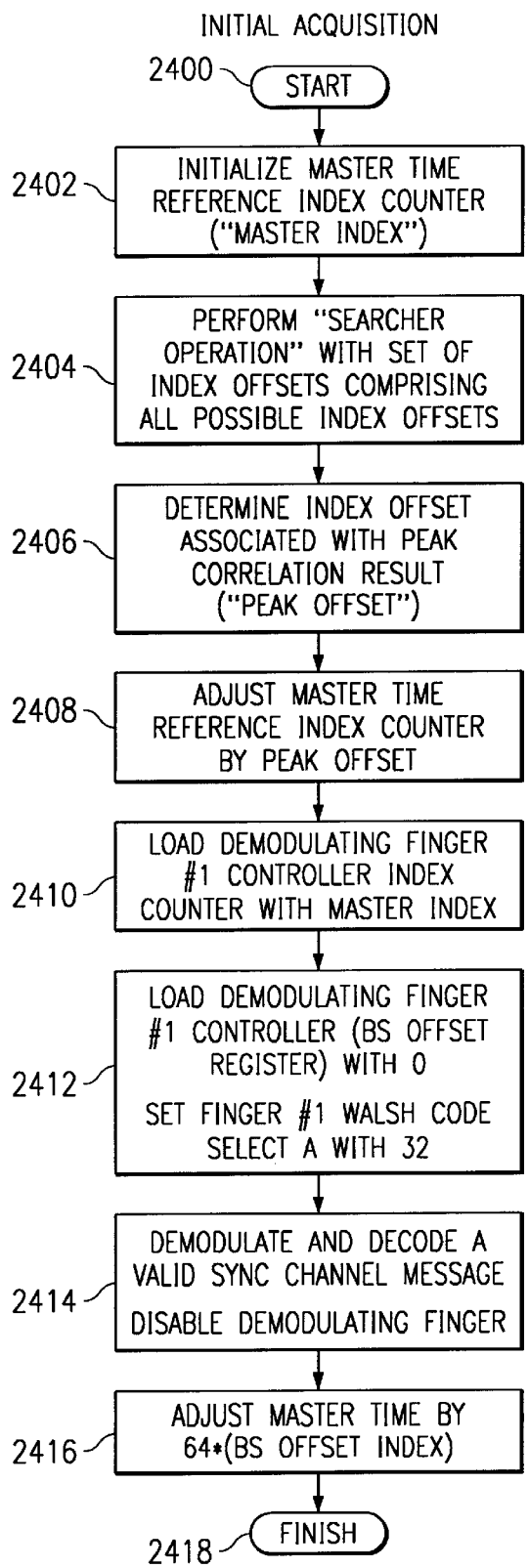
FIG. 24 is a flowchart describing a method of performing initial acquisition to the communication system of FIG. 10.

In one aspect of the invention, such additional timing information is maintained within both controller 1014 and a three state sub-frame counter of system time unit 1404. Referring to FIG. 24, step 2416 involves aligning the master time to the Nominal PN Sequence of the base station by adjusting master time by the base station offset. Step 2416 also involves resetting the state of the three state sub-frame counter. These steps may be accomplished as follows.

Figure 32:
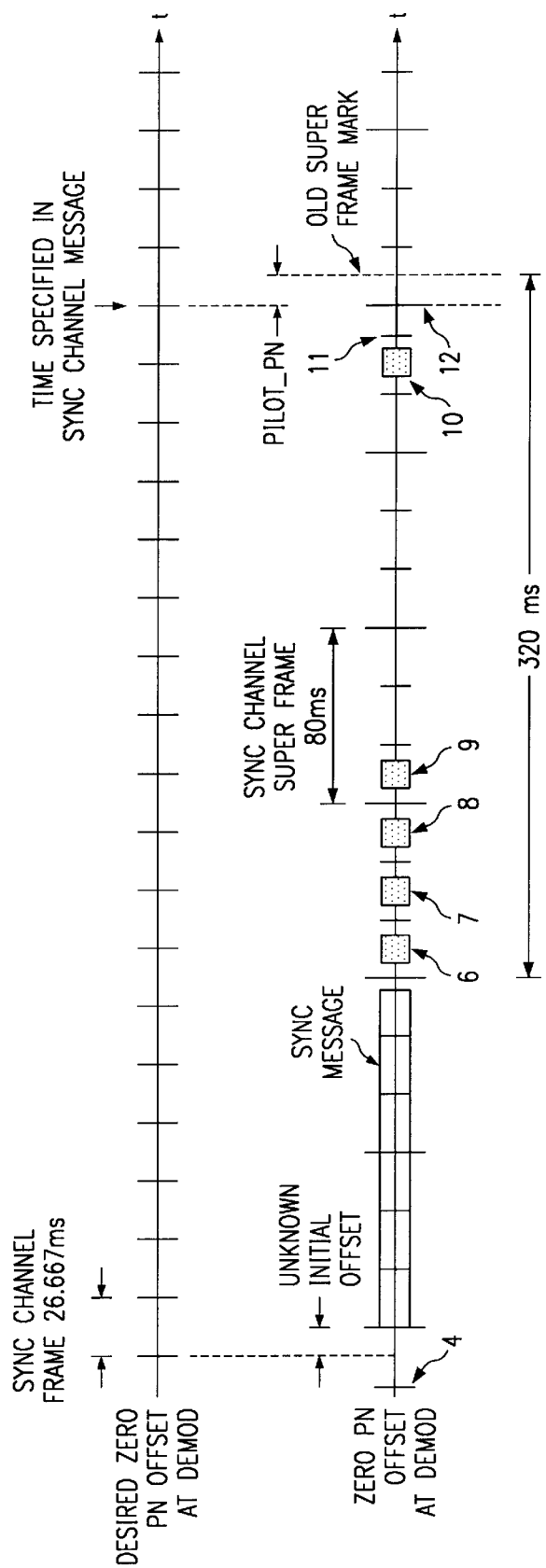
FIG. 32 is a timing diagram associated with a method of synchronizing a time reference of a mobile station to that of a base station.

Reference to a timing diagram of FIG. 32 will be made in connection with FIG. 24. Index counter 1406 is loaded with the base station offset (indicated as "PILOT_PN" in FIG. 32) upon that rollover of index counter 1406 at a time indicated in FIG. 32 as "11". Such loading is accomplished by providing system time unit 1404 with the base station offset and subsequently pulsing system time unit 1404 with an "arm" signal at a time indicated in FIG. 32 as "10". When so armed, system time unit 1404 will cause index counter 1406 to load base station offset at the subsequent rollover, Index counter 1406 will rollover again at a time indicated in FIG. 32 as "12". which is a time that corresponds to that received and specified in the Sync Channel Message as "System Time."

At that time, system time unit 1404 will reset the three state sub-frame counter where the system time correction is achieved. System time unit 1404 will then issue a superframe tick and controller will begin to receive interrupts in phase with system time (as described above). Controller 1014 may then maintain system time in increments of 80 msec based on these interrupts. System time is thereafter advantageously maintained in connection with controller 1014, system time unit 1404, and index counter 1406.

Figure 23:
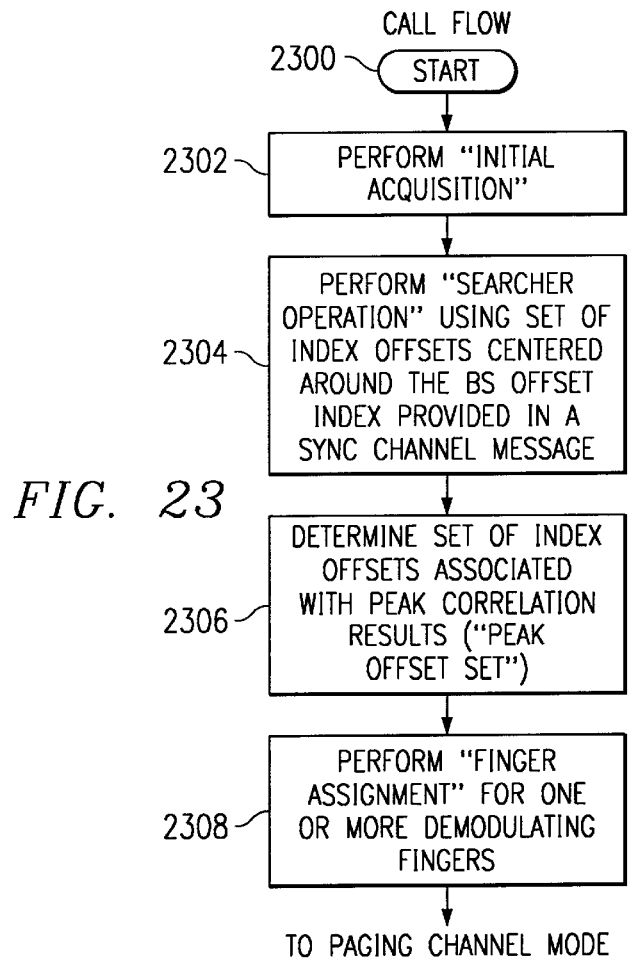
FIG. 23 is a flowchart describing a call flow operation of the mobile station of FIG. 10.

FIGS. 23–28 are flowcharts describing operation of mobile station of FIG. 1004. More particularly, FIG. 23 is a flowchart describing a call flow operation of mobile station 1004 of FIG. 10. Beginning at a start block 2300, initial acquisition is performed (step 2302). This step may be performed as described in relation to the flowchart of FIG 24, which is outlined later below. Next, a searcher operation is performed using a set of index offsets centered around the base station offset index provided in a sync channel message (2304). This step may be performed as described in relation to the flowchart of FIG. 25, which is outlined later below. Next, a set of index offsets associated with peak correlation results are determined (step 2306). This set may be referred to as a peak offset set. Next, one or more demodulating fingers are assigned to selected peak offsets from step 2306 (step 2308). This step may be performed as described in relation to the flowchart of FIG. 26, which is outlined later below. After step 2308, mobile station 1004 enters and processes in accordance with a paging channel mode. The paging channel mode may be performed as described in relation to the flowchart of FIG. 27, which is outlined later below.

FIG. 24 is a flowchart describing a method of performing initial acquisition of the system. This method may be performed in step 2302 of FIG. 23. The following description makes reference to FIG. 24, as well as to FIGS. 10, 12, 14, 19 and 20, in combination. Beginning at a start block 2400, controller 1014 initializes (or resets) index counter 1406 associated with the master time reference to some value (step 2402). (As the master time reference will already be at some arbitrary value, this step may be eliminated.) Next, a search operation is performed using a set of index offsets comprising all possible index offsets (step 2404). This set may include, for example, all $2^{15}$ PN offsets in an IS-95 system. This step may be performed as described in relation to FIG. 25, which is described later below. The index offset associated with the peak correlation result from step 2404 is then determined and/or selected (step 2406); this index offset may be referred to as the peak offset.

Index counter 1406 that corresponds to the master time is adjusted by the peak offset (step 2408). The objective here is to adjust index counter 1406 so that the peak offset is at an index offset of zero with respect to master time. More particularly, controller 1014 provides the peak offset at an input to adder 1408. Controller 1014 provides a load signal to index counter 1406 so that index counter 1406 is loaded with the sum of the master index and the peak offset.

Next, controller 1012 controls index counter 2004 of demodulating finger controller 1902 to be loaded with the newly adjusted master index (step 2410). Here, the index offset that is input to adder 2010 is zero, allowing the master index to pass directly to index counter 2004. Controller 1012 loads base station offset register 2006 with a value of zero as well (step 2412). Thus, the resulting finger index at an output of index counter 2004 is the master index. Controller 1012 sets Walsh code selector A of demodulating finger 1802 to channel 32 or the sync channel. Using sequence generator 1202, sequence unit 2002 obtains the sequence data corresponding to the finger index and the sync channel. The sequence data includes PN I and Q data as well as the Walsh code data associated with the sync channel.

Once obtained, sequence unit 2002 passes the sequence data to QPSK despreader and decimator 1904 and Walsh uncover 1906 and thus a received waveform is demodulated. More particularly, a valid sync channel message is demodulated and decoded (step 2414). Demodulating finger 1802 may then be disabled. Finally, index counter 1406 of master time reference 1302 (providing the master time) is adjusted by an amount corresponding to a base station offset index received in the sync message (step 2416). This is preferably done with the use of system time corrector 1404. Although step 2416 will be described later in more detail, in general, the master time is adjusted by 64 times the base station offset index. The flowchart ends at a finish block 2418.

FIG. 25 is a flowchart describing a method of performing a searcher operation. This method may be employed in step 2304 of FIG. 23. The following description makes reference to FIG. 25, as well a to FIGS. 10, 12, 16, and 27, in combination. Beginning at a start block 2500 of FIG. 25, searcher controller 1600 is provided with a set of index offsets from controller 1014 (step 2502). Hypothesis controller 1706 of searcher controller 1600 receives and manages this set of index offsets.

Hypothesis controller 1706 controls the loading of index counter 1704 with the sum of the maser index and a first index offset of the set, resulting in a searcher index at an output of index counter 1704. Hypothesis controller 1706 controls sequence unit 1702 to fetch the sequence data corresponding to the searcher index. The sequence data is obtained by searcher controller 1600 using sequence generator 1202. Sequence unit 1702 passes the sequence data to QPSK despreader and decimator 1602 and thus a received waveform is correlated with the sequence data corresponding to the searcher index (step 2504). The result is saved.

Next, hypothesis controller 1706 controls the loading of index counter 1704 with the sum of the master index and a next index offset of the set, resulting in a next searcher index at the output of index counter 1704. Hypothesis controller 1706 controls sequence unit 1702 to fetch the sequence data corresponding to the next searcher index. Sequence unit 1702 passes the sequence data to QPSK despreader and decimator 1602 and thus a received waveform is correlated with the sequence data corresponding to the next searcher offset (step 2506). The result is again saved. If the current index offset is not the last of the set of the index offsets, step 2506 is repeated as indicated. If the current index offset is the last of the set, hypothesis controller 1706 provides controller 1014 with all or some of the correlation results associated with the set of index offsets (step 2510). The flowchart ends at a finish block of 2512.

FIG. 26 is a flowchart describing a method of assigning a finger of a demodulator. This method may be employed in step 2308 of FIG. 23. Beginning at a start block 2600, controller 1014 chooses the "largest peak" of the peak offset (set (step 2602). That is, controller 1014 selects an offset that is associated with the largest peak of the set. This largest peak is removed from the set so that it is not used for a different finger assignment. Next, controller 1014 calculates the proper index offset to use for the finger assignment. More particularly, controller 1014 performs the following calculation:

index offset =(largest peak) −64*(Base Station Offset Index).

Controller 1014 provides this calculated index offset at the input of adder 2010, and loads the value of 64*(Base Station Offset Index) into base station offset register 2006. Controller 1014 provides a load signal to index counter 2004 so that it gets loaded with the sum of the master index and the index offset (step 2604). The base station offset is summed with the output of index counter 2004 at adder 2012, resulting in a finger index which is provided to sequence generator 1202. Next, controller 1014 determines which channels to decode, and selects and sets one or more of the plurality of Walsh code selectors (see FIG. 15C) to decode the selected channels (step 2608). The selected channels are demodulated and decoded by demodulating finger 1802 (step 2610). The flowchart ends at a finish block 2612.

Figure 27:
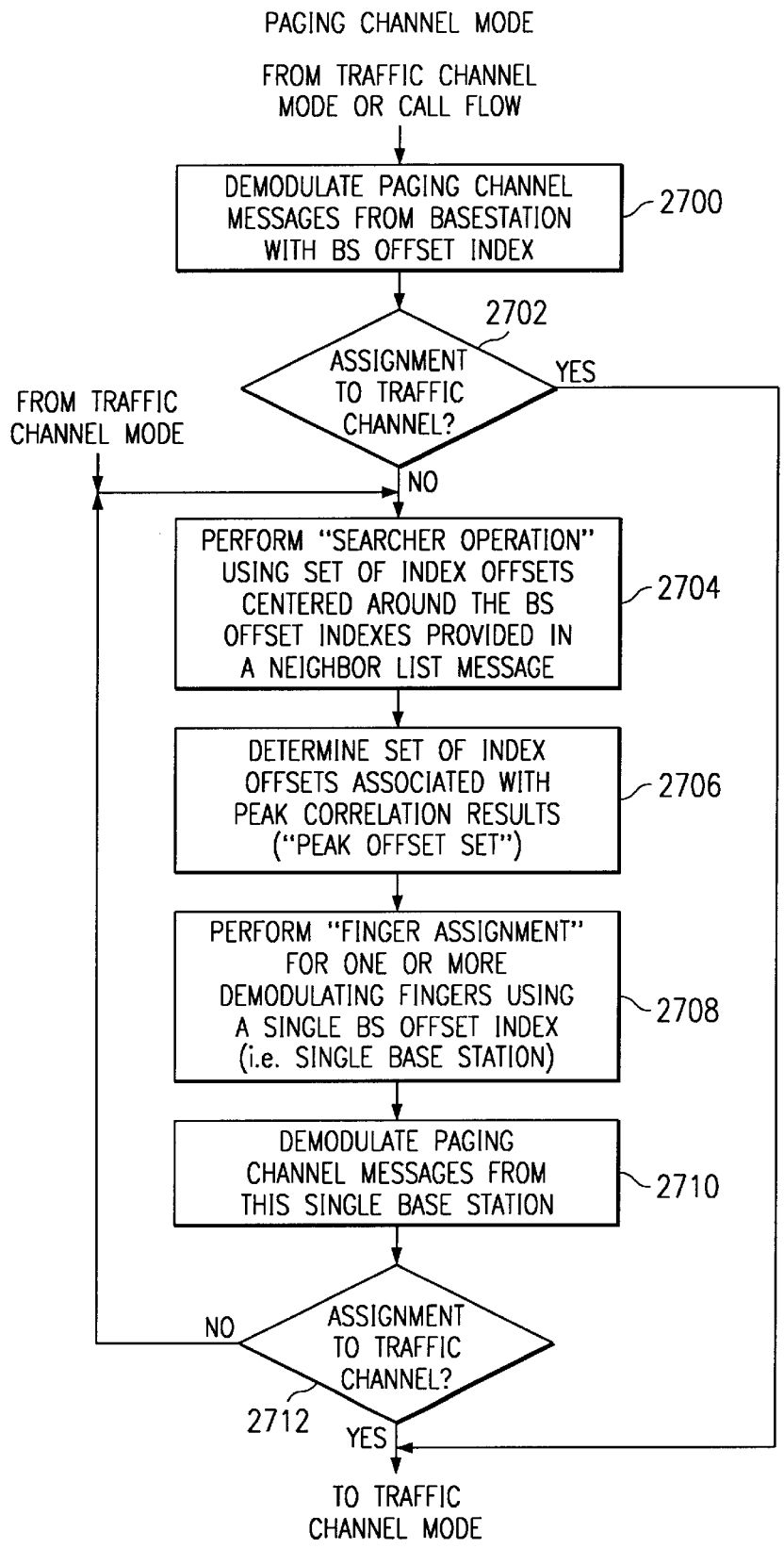
FIG. 27 is a flowchart describing a method of operating in a paging channel mode for the mobile station of FIG. 10.

FIG. 27 is a flowchart describing the operation of the paging channel mode of mobile station 1004. This method may be performed after step 2308 of FIG. 23. Paging channel messages from the base station are demodulated using the appropriate base station offset index (step 2700). This step may be performed similar to that described in relation to FIG. 26 (steps 2604, 2606, 2608, and 2610), and selecting the Walsh code for the paging channel (one of channels 1 through 7).

If there is an assignment to a traffic channel (step 2702), then a traffic channel mode is entered. The traffic channel mode is described below in relation to FIG. 28. If no such assignment is made, the searcher operation is performed using a set of index offsets centered around the base station offset indexes provided in a neighbor list message (step 2704). This step is performed as described in relation to FIG. 25. A set of index offsets associated with the peak correlation results (i.e., a peak offset set) is determined and selected (step 2706). Next, a finger assignment is performed for one or more demodulating fingers using a single base station offset index (i.e., a single base station) (step 2708). Paging channel messages from a single base station are demodulated with the base station offset index (step 2710). Steps 2708 and 2710 may be performed using techniques similar to those described in relation to FIG. 26 (steps 2604, 2606, 2608, and 2610). If there is an assignment to a traffic channel (step 2712), then the traffic channel mode is entered. If not, the flowchart repeats at step 2704.

Figure 28:
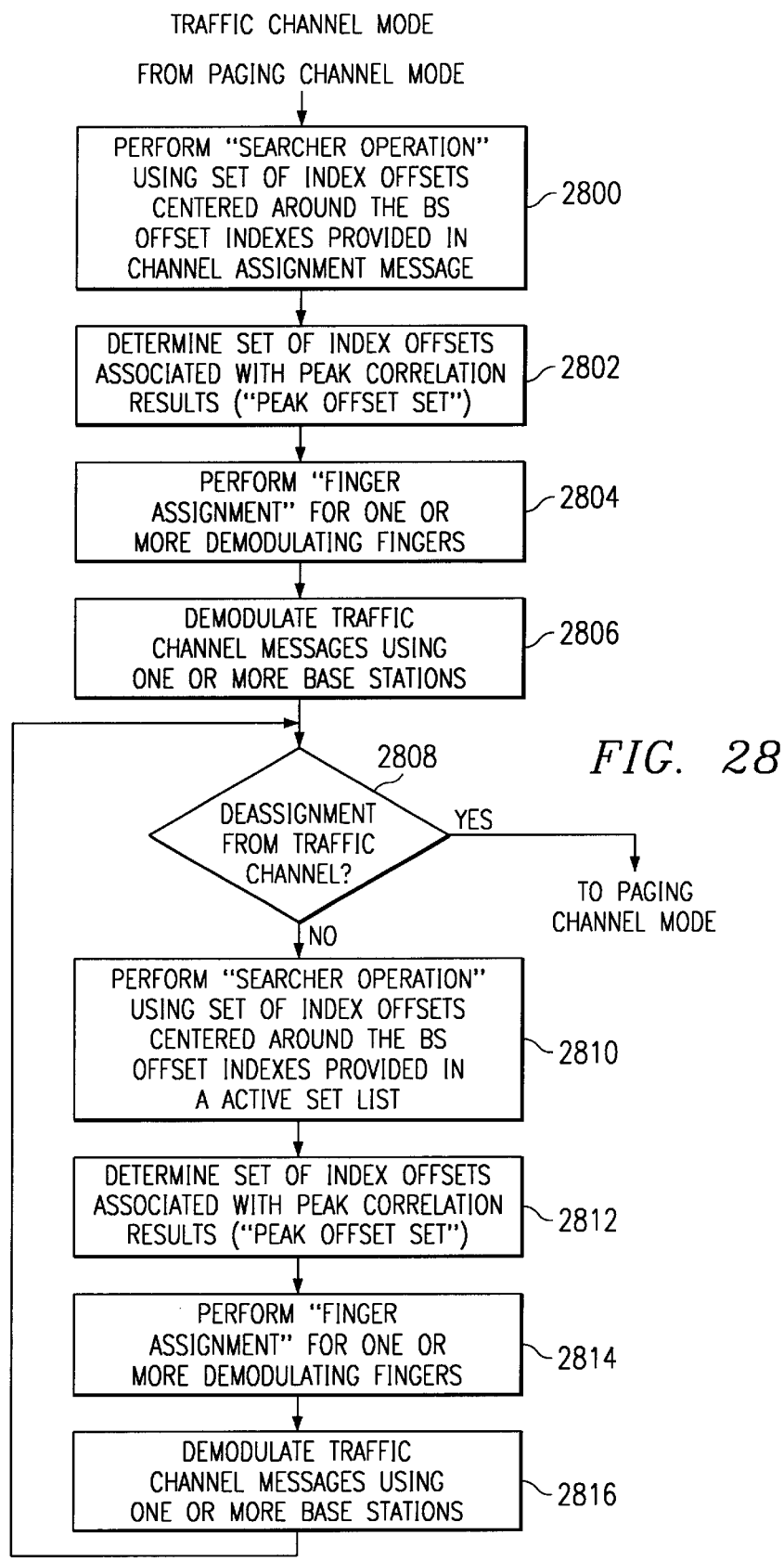
FIG. 28 is a flowchart describing a method of operating in a traffic channel mode for the mobile station of FIG. 10.

FIG. 28 is a method describing operation of the traffic channel mode of mobile station 1004. This mode may be entered at various times, such as at steps 2702 and 2712 of FIG. 27. The searcher operation is performed using index offsets centered around the base station offset index provided in a traffic channel assignment message (step 2800). This step is performed as described in relation to FIG. 25. A set of index offsets associated with the peak correlation results are determined and selected (step 2802). Next, a finger assignment is performed for one or more demodulating fingers (step 2804). Traffic channel messages from one or more base stations are demodulated (step 2806). Steps 2804 and 2806 may be performed using techniques similar to those described in relation to FIG. 26 (steps 2604, 2606, 2608, and 2610).

If there is a deassignment from the traffic channel (step 2808), then the paging channel mode is entered. The paging channel mode is described above in relation to FIG. 27. If no such deassignment is made, the searcher operation is performed using a set of index offsets centered around the base station offset indexes provided in an active set list (step 2810). The searcher operation is described in relation to FIG. 25. A set of index offsets associated with the peak correlation results (i.e., a peak offset set) are determined and selected (step 2812). Next, a finger assignment is performed for one or more demodulating fingers (step 2814). Traffic channel messages from one or more base stations are demodulated (step 2816). Steps 2814 and 2816 may be performed using techniques similar to those described in relation to FIG. 26 (steps 2604, 2606, 2608, and 2610). The flowchart repeats at step 2808.

Suitable combination of the several embodiments and applications described herein are understood, apparent to those skilled in the art, and hereby disclosed. Although embodiments of the present invention have been described in relation to mobile station 1004, the methods and devices can be applied to base station 1002 in the same or similar manner. Although many components described herein are hardware components, the methods described may be performed in connection with a computer program product. Such a computer program product includes a computer readable storage medium and a computer program mechanism embedded in the computer readable storage medium, for executing the methods in a suitable processor.

The many methods and devices described provide for a number of uses and advantages. The present invention allows for any arbitrary sequence to be generated for communications (e.,g., it is not confined to those data sequences that can be generated using LFSR circuits). As readily apparent, the storage of such sequences in memory provides a useful application in itself, especially the storage of PN sequences associated with IS-95 and/or IS-2000 standards. A change to the data sequence and/or data sequence length can be made in the design without having to make fundamental design changes. In addition, the present invention may allow for the relatively direct and instant selection and generation of any desirable offset of a data sequence. Finally, multiple data sequences based on offsets of a nominal data sequence can be generated while advantageously sharing components.

When applied to augmented ML PN sequences (length $2^N$), the present invention need not utilize circuits for the detection of the appropriate stuff state in which to insert an additional sequence bit, circuits for the insertion of an additional sequence bit, or circuits for the avoidance of false or missed detection of the stuff state due to abrupt changes in the PN sequence phase caused by PN sequence phase advancing or retarding.

Each of a plurality of demodulating fingers can access a single data sequence for demodulation based on its associated index. Multiple data sequences, such as PN[0a9] and Q sequences, or PN I and Q sequences and Walsh sequences, can be generated based on a single index. The state of both PN I and Q sequences may be transferred between the searcher, the demodulating fingers, the modulator, the master timer, and the controller using a single index. Each of a plurality of demodulating fingers may utilize a single index for both IS-95 ($2^{15}$ bit I sequence and $2^{15}$ bit Q sequence) and IS-2000 ($3*2^{15}$ bit I sequence and $3*2^{15}$ bit Q sequence) standards, with selection between such sequence sets also possible. Each demodulating finger may utilize a single respective index for the generation of a plurality of Walsh sequence chips in a parallel manner, allowing for the demodulation of multiple code channels. A base station offset register or adder, providing partitioning of total index offset between a path delay portion and a portion associated with the base station offset, may be used in connection with obtaining desired sequence shifts. Each counter may comprise both a chip counter and a sub-chip counter for PN time resolution down to ⅛ of a chip. Time may be tracked for the timing controller and demodulating fingers with use of a sub-chip counter.

In other inventive aspects, partitioning the pilot filtering/estimation and the dot product operations between a controller (performing the pilot filtering/estimation) and a demodulating finger (performing the dot product in hardware) provides several advantages. Such advantages include (i) performing, in hardware, computationally intense dot product operations for one or multiple symbol streams, and (ii) flexibility in the filtering structure and selection of filter coefficients with use of a programmable controller. Advantage (i) is especially important in modes of operation where multiple I, Q symbol pairs corresponding to data uncovered from multiple Walsh code channels require a dot product operation with the I, Q pilot estimate.

Importantly, the described methods and apparatus make special use memory having data sequences stored therein, and counters, whereas the prior art makes use of LFSR circuits. As readily apparent, the present invention provides several advantages in simplicity and constitutes a breakthrough and a technological leap in the arts. The present invention is a more particular breakthrough in CDMA communication systems which have long used LFSR circuits for data sequence generation. Thus, the scope of the claimed invention should be understood to be quite broad and warrant a broad range of equivalent structures and functionalities.

We claim:

1. A method for use in maintaining timing in spread spectrum communications, the method comprising:

counting at a chip rate to provide a first count that rolls over at or near the end of a nominal zero-offset pseudorandom noise (PN) sequence; and during the step of counting at the chip rate to provide the first count, counting a the chip rate to provide a second count that is out-of-phase with the first count by a base station offset value and a path delay value.

2. A method for use in maintaining timing in spread spectrum communications, the method comprising:

counting at a chip rate to provide a first count that rolls over at or near the end of a nominal zero-offset pseudorandom noise (PN) sequence;

counting at the chip rate to provide a second count that is out-of-phase with the first count by a first base station offset value and a first path delay value; and counting at the chip rate to provide a third count that is out-of-phase with the first count by a second base station offset value and a second path delay value.

3. The method according to claim 1, wherein the PN sequence has a length of L;

wherein counting to provide the first count comprises counting at least L discrete values;

and wherein counting to provide the second count comprises counting at least L discrete values.

4. The method according to claim 1, wherein the PN sequence has a length of $2^N$;

wherein counting to provide the first count comprises using a first at least N-bit binary counter; and wherein counting to provide the second count comprises using a second at least N-bit binary counter.

5. The method according to claim 1, wherein the PN sequence has a length of $2^{15}$;

wherein counting to provide the first count comprises counting at least $2^{15}$ discrete values; and wherein counting to provide the first count comprises counting at lease $2^{15}$ discrete values.

6. A method for use in maintaining timing for spread spectrum communications, the method comprising:

repeatedly incrementing an N-bit master binary counter at a chip rate to provide a count that rolls over at or near the end of a nominal zero-offset pseudorandom noise (PN) sequence having a length of $2^N$; and for each counter of a plurality of N-bit slave binary counters:

repeatedly incrementing the N-bit slave binary counter at the chip rate to generate a count that may be out-of-phase with the count associated with the N-bit master binary counter by a base station offset value and a path delay value.

7. The method according to claim 6, wherein N=15.

8. The method according to claim 6 wherein, to provide the count that may be out-of-phase with the count associated with the N-bit master binary counter, the method further comprises the step of:

adding the base station offset value to an output of the N-bit slave binary counter.

9. A method for use in maintaining timing for spread spectrum communications, the method comprising:

repeatedly incrementing an N-bit master binary counter at a chip rate to provide a count that rolls over at or near the end of a nominal zero-offset pseudorandom noise (PN) sequence having a length of $2^N$; and for each counter of a plurality of N-bit slave binary counters:

loading the N-bit slave binary counter with a counter value derived from an output of the N-bit master binary counter; and repeatedly incrementing the N-bit slave binary counter at the chip rate to generate a count that may be out-of-phase with the count associated with the N-bit master binary counter by a base station offset value and a path delay value.

10. A method for use in maintaining timing for spread spectrum communications, the method comprising:

repeatedly incrementing an N-bit master binary counter at a chip rate to provide a count that rolls over at or near the end of a nominal zero-offset pseudorandom noise (PN) sequence having a length of $2^N$; and for each counter of a plurality of N-bit slave binary counters:

receiving offset information from a base station to provide a base station offset value; and repeatedly incrementing the N-bit slave binary counter at the chip rate to generate a count that may be out-of-phase with the count associated with the N-bit master binary counter by the base station offset value and a path delay value.

* * * * *